(12) United States Patent
Papakos et al.

(10) Patent No.: US 10,097,303 B2
(45) Date of Patent: Oct. 9, 2018

(54) METHODS AND APPARATUS FOR USING AN EMBEDDED OPTICAL SIGNAL SOURCE WITHIN AN OPTICAL NODE TO LOCATE PROBLEMATIC OPTICAL SPANS

(71) Applicants: Kimon Papakos, Evanston, IL (US); Mark E. Boduch, Geneva, IL (US)

(72) Inventors: Kimon Papakos, Evanston, IL (US); Mark E. Boduch, Geneva, IL (US)

( * ) Notice: Subject to any disclaimer, the term of this patent is extended or adjusted under 35 U.S.C. 154(b) by 49 days.

(21) Appl. No.: 15/282,161

(22) Filed: Sep. 30, 2016

(65) Prior Publication Data

US 2017/0099099 A1    Apr. 6, 2017

Related U.S. Application Data

(60) Provisional application No. 62/235,611, filed on Oct. 1, 2015.

(51) Int. Cl.
| | | |
|---|---|---|
| *H04B 10/08* | (2006.01) | |
| *H04J 14/02* | (2006.01) | |
| *H04B 10/07* | (2013.01) | |
| *H04B 10/077* | (2013.01) | |
| *H04B 10/572* | (2013.01) | |
| *H04B 10/079* | (2013.01) | |

(52) U.S. Cl.
CPC ............ *H04J 14/021* (2013.01); *H04B 10/07* (2013.01); *H04B 10/0773* (2013.01); *H04B 10/0775* (2013.01); *H04B 10/079* (2013.01); *H04B 10/07953* (2013.01); *H04B 10/572* (2013.01)

(58) Field of Classification Search
CPC .......................... H04J 14/0269; H04J 14/0271
USPC ............................................................ 398/57
See application file for complete search history.

(56) References Cited

U.S. PATENT DOCUMENTS

| | | | | |
|---|---|---|---|---|
| 5,029,158 | A * | 7/1991 | Reid .................... | H04B 1/74 370/226 |
| 6,768,718 | B1 * | 7/2004 | Beshai ................. | H04L 45/00 370/237 |
| 8,897,306 | B2 * | 11/2014 | Hayashi ............. | H04L 12/5695 370/237 |
| 9,008,514 | B2 * | 4/2015 | Boduch ................ | H04J 14/021 398/83 |
| 9,276,695 | B2 | 3/2016 | Boduch et al. | |
| 9,319,132 | B2 * | 4/2016 | Ishii ................ | H04B 10/07953 |
| 9,374,186 | B1 | 6/2016 | Boduch et al. | |
| 2004/0096215 | A1 * | 5/2004 | Evangelides, Jr. .. | H04B 10/075 398/33 |
| 2005/0213965 | A1 * | 9/2005 | Bergmann ............ | H04B 10/07 398/16 |
| 2008/0008474 | A1 * | 1/2008 | Boduch ............... | H04J 14/0204 398/85 |
| 2009/0010643 | A1 * | 1/2009 | DeLew ................ | H04B 10/035 398/17 |

(Continued)

OTHER PUBLICATIONS

IGIC, Inc. Staff, Fiber Optics in Buildings, 1994, Information Gatekeepers Inc., pp. 33-35.*

*Primary Examiner* — Ken N Vanderpuye
*Assistant Examiner* — Jai Lee

(57) ABSTRACT

Example embodiments and methods of the present invention relate to utilizing optical transmitters and optical receivers embedded within reconfigurable optical add-drop multiplexers of optical nodes to identify problematic optical spans within an optical network.

17 Claims, 18 Drawing Sheets

(56) References Cited

U.S. PATENT DOCUMENTS

| | | | |
|---|---|---|---|
| 2009/0226168 A1* | 9/2009 | Boduch | H04J 14/0204 398/48 |
| 2009/0296719 A1* | 12/2009 | Maier | H04L 45/12 370/400 |
| 2010/0266275 A1* | 10/2010 | Xia | H04B 10/0773 398/16 |
| 2011/0052193 A1* | 3/2011 | Takita | H04J 14/0227 398/58 |
| 2012/0140635 A1* | 6/2012 | Aoki | H04L 45/12 370/238 |
| 2013/0315579 A1* | 11/2013 | Xia | H04Q 11/0001 398/5 |
| 2014/0112655 A1* | 4/2014 | Huang | H04J 14/0291 398/14 |
| 2014/0199061 A1* | 7/2014 | Shinohara | H04J 14/0257 398/5 |
| 2016/0080104 A1* | 3/2016 | Nakashima | H04J 14/0257 398/79 |
| 2016/0261936 A1* | 9/2016 | Nakatsugawa | H04L 45/22 |
| 2016/0373187 A1* | 12/2016 | Oda | H04B 10/07953 |

* cited by examiner

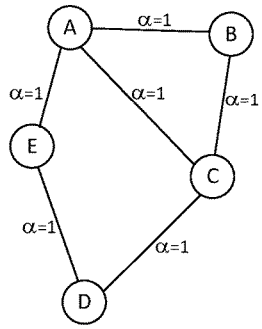

FIG. 5A

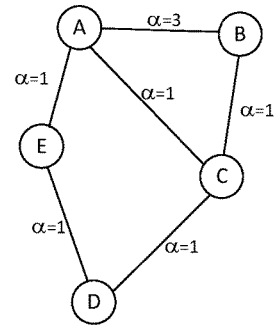

FIG. 5B

| | | | | | Total Occurrences of Spans Within Tested Optical Paths | | | | | |
|---|---|---|---|---|---|---|---|---|---|---|
| Connection | Path 1 | Path 2 | Path 3 | Path 4 | AB | BC | AC | AE | CD | DE |
| A to B | AB | ACB | AEDCB | | 1 | 2 | 1 | 1 | 1 | 1 |
| A to C | AC | ABC | AEDC | | 1 | 1 | 1 | 1 | 1 | 1 |
| A to D | AED | ACD | ABCD | | 1 | 1 | 1 | 1 | 2 | 1 |
| A to E | AE | ACDE | ABCDE | | 1 | 1 | 1 | 1 | 2 | 2 |
| B to C | BC | BAC | BAEDC | | 2 | 1 | 1 | 1 | 1 | 1 |
| B to D | BCD | BCAED | BACD | BAED | 2 | 2 | 2 | 2 | 2 | 2 |
| B to E | BAE | BACDE | BCDE | BCAE | 2 | 2 | 2 | 2 | 2 | 2 |
| C to D | CD | CAED | CBAED | | 1 | 1 | 1 | 2 | 1 | 2 |
| C to E | CDE | CAE | CBAE | | 1 | 1 | 1 | 2 | 1 | 1 |
| D to E | DE | DCAE | DCBAE | | 1 | 1 | 1 | 2 | 1 | 1 |
| | | | | TOTALS | 13 | 13 | 12 | 15 | 14 | 14 |

FIG. 5C

| Pass if Total Path Performance Penalty no greater than 4 | | | | | Total Occurrences of Spans Within Degraded Optical Paths (Failed Spans) | | | | | |
|---|---|---|---|---|---|---|---|---|---|---|
| Connection | Path 1 | Path 2 | Path 3 | Path 4 | AB | BC | AC | AE | CD | DE |
| A to B | AB | ACB | AEDCB | | 0 | 0 | 0 | 0 | 0 | 0 |
| A to C | AC | ABC | AEDC | | 0 | 0 | 0 | 0 | 0 | 0 |
| A to D | AED | ACD | *ABCD* | | 1 | 1 | 0 | 0 | 1 | 0 |
| A to E | AE | ACDE | *ABCDE* | | 1 | 1 | 0 | 0 | 1 | 1 |
| B to C | BC | BAC | *BAEDC* | | 1 | 0 | 0 | 1 | 1 | 1 |
| B to D | BCD | BCAED | *BACD* | *BAED* | 2 | 0 | 1 | 1 | 1 | 1 |
| B to E | BAE | *BACDE* | BCDE | BCAE | 1 | 0 | 1 | 0 | 1 | 1 |
| C to D | CD | CAED | *CBAED* | | 1 | 1 | 0 | 1 | 0 | 1 |
| C to E | CDE | CAE | *CBAE* | | 1 | 1 | 0 | 1 | 0 | 0 |
| D to E | DE | DCAE | *DCBAE* | | 1 | 1 | 0 | 1 | 1 | 0 |
| | | | | TOTALS | 9 | 5 | 2 | 5 | 6 | 5 |

FIG. 5D

| SPANS | α | Total Spans Tested | Total Spans Failed | Total Spans Passed | Pass % | Fail % | Pass Ratio | Fail Ratio |
|---|---|---|---|---|---|---|---|---|
| AB | 3 | 13 | 9 | 4 | 31 | 69 | 0.31 | 0.69 |
| BC | 1 | 13 | 5 | 8 | 62 | 38 | 0.62 | 0.38 |
| AC | 1 | 12 | 2 | 10 | 83 | 17 | 0.83 | 0.17 |
| AE | 1 | 15 | 5 | 10 | 67 | 33 | 0.67 | 0.33 |
| CD | 1 | 14 | 6 | 8 | 57 | 43 | 0.57 | 0.43 |
| DE | 1 | 14 | 5 | 9 | 64 | 36 | 0.64 | 0.36 |

FIG. 5E

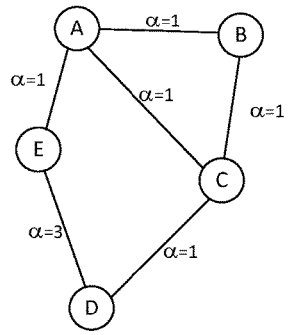

FIG. 6A

| Pass if Total Path Performance Penalty no greater than 4 | | | | Total Occurrences of Spans Within Degraded Optical Paths (Failed Spans) | | | | | |
|---|---|---|---|---|---|---|---|---|---|
| Connection | Path 1 | Path 2 | Path 3 | Path 3 | AB | BC | AC | AE | CD | DE |
| A to B | AB | ACB | *AEDCB* | | 0 | 1 | 0 | 1 | 1 | 1 |
| A to C | AC | ABC | *AEDC* | | 0 | 0 | 0 | 1 | 1 | 1 |
| A to D | AED | ACD | ABCD | | 0 | 0 | 0 | 0 | 0 | 0 |
| A to E | AE | *ACDE* | *ABCDE* | | 1 | 1 | 1 | 0 | 2 | 2 |
| B to C | BC | BAC | *BAEDC* | | 1 | 0 | 0 | 1 | 1 | 1 |
| B to D | BCD | *BCAED* | BACD | *BAED* | 1 | 1 | 1 | 2 | 0 | 2 |
| B to E | BAE | *BACDE* | *BCDE* | BCAE | 1 | 1 | 1 | 0 | 2 | 2 |
| C to D | CD | *CAED* | *CBAED* | | 1 | 1 | 1 | 2 | 0 | 2 |
| C to E | CDE | CAE | CBAE | | 0 | 0 | 0 | 0 | 0 | 0 |
| D to E | DE | DCAE | DCBAE | | 0 | 0 | 0 | 0 | 0 | 0 |
| | | | | TOTALS | 5 | 5 | 4 | 7 | 7 | 11 |

FIG. 6B

| SPANS | α | Total Spans Tested | Total Spans Failed | Total Spans Passed | Pass % |
|---|---|---|---|---|---|
| AB | 1 | 13 | 5 | 8 | 62 |
| BC | 1 | 13 | 5 | 8 | 62 |
| AC | 1 | 12 | 4 | 8 | 67 |
| AE | 1 | 15 | 7 | 8 | 53 |
| CD | 1 | 14 | 7 | 7 | 50 |
| DE | 3 | 14 | 11 | 3 | 21 |

FIG. 6C

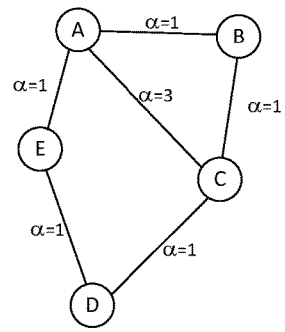

FIG. 7A

| Pass if Total Path Performance Penalty no greater than 4 | | | | Total Occurrences of Spans Within Degraded Optical Paths (Failed Spans) | | | | | |
|---|---|---|---|---|---|---|---|---|---|
| Connection | Path 1 | Path 2 | Path 3 | Path 3 | AB | BC | AC | AE | CD | DE |
| A to B | AB | ACB | AEDCB | | 0 | 0 | 0 | 0 | 0 | 0 |
| A to C | AC | ABC | AEDC | | 0 | 0 | 0 | 0 | 0 | 0 |
| A to D | AED | ACD | ABCD | | 0 | 0 | 0 | 0 | 0 | 0 |
| A to E | AE | *ACDE* | ABCDE | | 0 | 0 | 1 | 0 | 1 | 1 |
| B to C | BC | BAC | BAEDC | | 0 | 0 | 0 | 0 | 0 | 0 |
| B to D | BCD | *BCAED* | *BACD* | BAED | 1 | 1 | 2 | 1 | 1 | 1 |
| B to E | BAE | *BACDE* | BCDE | *BCAE* | 1 | 1 | 2 | 1 | 1 | 1 |
| C to D | CD | *CAED* | CBAED | | 0 | 0 | 1 | 1 | 0 | 1 |
| C to E | CDE | CAE | CBAE | | 0 | 0 | 0 | 0 | 0 | 0 |
| D to E | DE | *DCAE* | DCBAE | | 0 | 0 | 1 | 1 | 1 | 0 |
| | | | | TOTALS | 2 | 2 | 7 | 4 | 4 | 4 |

FIG. 7B

| SPANS | α | Total Spans Tested | Total Spans Failed | Total Spans Passed | Pass Percentage |
|---|---|---|---|---|---|
| AB | 1 | 13 | 2 | 11 | 85 |
| BC | 1 | 13 | 2 | 11 | 85 |
| AC | 3 | 12 | 7 | 5 | 42 |
| AE | 1 | 15 | 4 | 11 | 73 |
| CD | 1 | 14 | 4 | 10 | 71 |
| DE | 1 | 14 | 4 | 10 | 71 |

FIG. 7C

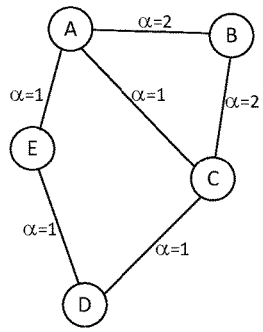

FIG. 8A

| Pass if Total Path Performance Penalty no greater than 4 | | | | | Total Occurrences of Spans Within Degraded Optical Paths (Failed Spans) | | | | | |
|---|---|---|---|---|---|---|---|---|---|---|
| Connection | Path 1 | Path 2 | Path 3 | Path 3 | AB | BC | AC | AE | CD | DE |
| A to B | AB | ACB | *AEDCB* | | 0 | 1 | 0 | 1 | 1 | 1 |
| A to C | AC | ABC | AEDC | | 0 | 0 | 0 | 0 | 0 | 0 |
| A to D | AED | ACD | *ABCD* | | 1 | 1 | 0 | 0 | 1 | 0 |
| A to E | AE | ACDE | *ABCDE* | | 1 | 1 | 0 | 0 | 1 | 1 |
| B to C | BC | BAC | BAEDC | | 0 | 0 | 0 | 0 | 0 | 0 |
| B to D | BCD | *BCAED* | BACD | BAED | 0 | 1 | 1 | 1 | 0 | 1 |
| B to E | BAE | *BACDE* | BCDE | BCAE | 1 | 0 | 1 | 0 | 1 | 1 |
| C to D | CD | CAED | *CBAED* | | 1 | 1 | 0 | 1 | 0 | 1 |
| C to E | CDE | CAE | *CBAE* | | 1 | 1 | 0 | 1 | 0 | 0 |
| D to E | DE | DCAE | *DCBAE* | | 1 | 1 | 0 | 1 | 1 | 0 |
| | | | | TOTALS | 6 | 7 | 2 | 5 | 5 | 5 |

FIG. 8B

| SPANS | α | Total Spans Tested | Total Spans Failed | Total Spans Passed | Pass % |
|---|---|---|---|---|---|
| AB | 2 | 13 | 6 | 7 | 54 |
| BC | 2 | 13 | 7 | 6 | 46 |
| AC | 1 | 12 | 2 | 10 | 83 |
| AE | 1 | 15 | 5 | 10 | 67 |
| CD | 1 | 14 | 5 | 9 | 64 |
| DE | 1 | 14 | 5 | 9 | 64 |

FIG. 8C

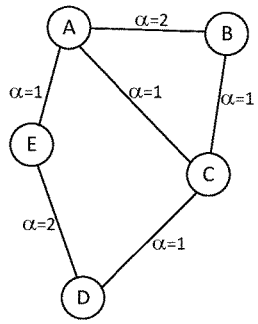

FIG. 9A

| Pass if Total Path Performance Penalty no greater than 4 | | | | Total Occurrences of Spans Within Degraded Optical Paths (Failed Spans) | | | | | |
|---|---|---|---|---|---|---|---|---|---|
| Connection | Path 1 | Path 2 | Path 3 | Path 3 | AB | BC | AC | AE | CD | DE |
| A to B | AB | ACB | *AEDCB* | | 0 | 1 | 0 | 1 | 1 | 1 |
| A to C | AC | ABC | AEDC | | 0 | 0 | 0 | 0 | 0 | 0 |
| A to D | AED | ACD | ABCD | | 0 | 0 | 0 | 0 | 0 | 0 |
| A to E | AE | ACDE | *ABCDE* | | 1 | 1 | 0 | 0 | 1 | 1 |
| B to C | BC | BAC | *BAEDC* | | 1 | 0 | 0 | 1 | 1 | 1 |
| B to D | BCD | *BCAED* | BACD | *BAED* | 1 | 1 | 1 | 2 | 0 | 2 |
| B to E | BAE | *BACDE* | BCDE | BCAE | 1 | 0 | 1 | 0 | 1 | 1 |
| C to D | CD | CAED | *CBAED* | | 1 | 1 | 0 | 1 | 0 | 1 |
| C to E | CDE | CAE | CBAE | | 0 | 0 | 0 | 0 | 0 | 0 |
| D to E | DE | DCAE | *DCBAE* | | 1 | 1 | 0 | 1 | 1 | 0 |
| | | | | TOTALS | 6 | 5 | 2 | 6 | 5 | 7 |

FIG. 9B

| SPANS | α | Total Spans Tested | Total Spans Failed | Total Spans Passed | Pass % |
|---|---|---|---|---|---|
| AB | 2 | 13 | 6 | 7 | 54 |
| BC | 1 | 13 | 5 | 8 | 62 |
| AC | 1 | 12 | 2 | 10 | 83 |
| AE | 1 | 15 | 6 | 9 | 60 |
| CD | 1 | 14 | 5 | 9 | 64 |
| DE | 2 | 14 | 7 | 7 | 50 |

FIG. 9C

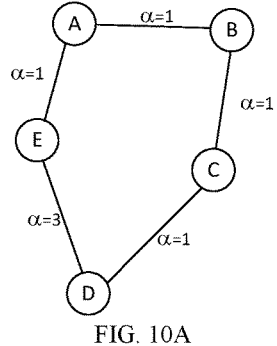

FIG. 10A

| | | | | | Total Occurrences of Spans Within Tested Optical Paths | | | | | |
|---|---|---|---|---|---|---|---|---|---|---|
| Connection | Path 1 | Path 2 | Path 3 | Path 3 | AB | BC | AC | AE | CD | DE |
| A to B | AB | | AEDCB | | 1 | 1 | 0 | 1 | 1 | 1 |
| A to C | ABC | | AEDC | | 1 | 1 | 0 | 1 | 1 | 1 |
| A to D | AED | | ABCD | | 1 | 1 | 0 | 1 | 1 | 1 |
| A to E | AE | | ABCDE | | 1 | 1 | 0 | 1 | 1 | 1 |
| B to C | BC | | BAEDC | | 1 | 1 | 0 | 1 | 1 | 1 |
| B to D | BCD | | BAED | | 1 | 1 | 0 | 1 | 1 | 1 |
| B to E | BAE | | BCDE | | 1 | 1 | 0 | 1 | 1 | 1 |
| C to D | CD | | CBAED | | 1 | 1 | 0 | 1 | 1 | 1 |
| C to E | CDE | | CBAE | | 1 | 1 | 0 | 1 | 1 | 1 |
| D to E | DE | | DCBAE | | 1 | 1 | 0 | 1 | 1 | 1 |
| | | | | TOTALS | 10 | 10 | 0 | 10 | 10 | 10 |

FIG. 10B

| Pass if Total Path Performance Penalty no greater than 4 | | | | | Total Occurrences of Spans Within Degraded Optical Paths (Failed Spans) | | | | | |
|---|---|---|---|---|---|---|---|---|---|---|
| Connection | Path 1 | Path 2 | Path 3 | Path 3 | AB | BC | AC | AE | CD | DE |
| A to B | AB | | *AEDCB* | | 0 | 1 | 0 | 1 | 1 | 1 |
| A to C | ABC | | *AEDC* | | 0 | 0 | 0 | 1 | 1 | 1 |
| A to D | AED | | ABCD | | 0 | 0 | 0 | 0 | 0 | 0 |
| A to E | AE | | *ABCDE* | | 1 | 1 | 0 | 0 | 1 | 1 |
| B to C | BC | | *BAEDC* | | 1 | 0 | 0 | 1 | 1 | 1 |
| B to D | BCD | | *BAED* | | 1 | 0 | 0 | 1 | 0 | 1 |
| B to E | BAE | | *BCDE* | | 0 | 1 | 0 | 0 | 1 | 1 |
| C to D | CD | | *CBAED* | | 1 | 1 | 0 | 1 | 0 | 1 |
| C to E | CDE | | CBAE | | 0 | 0 | 0 | 0 | 0 | 0 |
| D to E | DE | | DCBAE | | 0 | 0 | 0 | 0 | 0 | 0 |
| | | | | TOTALS | 4 | 4 | 0 | 5 | 5 | 7 |

FIG. 10C

| SPANS | $\alpha$ | Total Spans Tested | Total Spans Failed | Total Spans Passed | Pass Percentage |
|---|---|---|---|---|---|
| AB | 1 | 10 | 4 | 6 | 60 |
| BC | 1 | 10 | 4 | 6 | 60 |
| AC | | 0 | 0 | 0 | |
| AE | 1 | 10 | 5 | 5 | 50 |
| CD | 1 | 10 | 5 | 5 | 50 |
| DE | 3 | 10 | 7 | 3 | 30 |

FIG. 10D

| Connection | Path 1 | Path 2 | Path 3 | Path 3 | Total Occurrences of Spans Within Tested Optical Paths | | | | | |
|---|---|---|---|---|---|---|---|---|---|---|
| | | | | | AB | BC | CD | DE | EF | FG |
| A to B | AB | | | | 1 | 0 | 0 | 0 | 0 | 0 |
| A to C | ABC | | | | 1 | 1 | 0 | 0 | 0 | 0 |
| A to D | ABCD | | | | 1 | 1 | 1 | 0 | 0 | 0 |
| A to E | ABCDE | | | | 1 | 1 | 1 | 1 | 0 | 0 |
| A to F | ABCDEF | | | | 1 | 1 | 1 | 1 | 1 | 0 |
| A to G | ABCDEFG | | | | 1 | 1 | 1 | 1 | 1 | 1 |
| B to C | BC | | | | 0 | 1 | 0 | 0 | 0 | 0 |
| B to D | BCD | | | | 0 | 1 | 1 | 0 | 0 | 0 |
| B to E | BCDE | | | | 0 | 1 | 1 | 1 | 0 | 0 |
| B to F | BCDEF | | | | 0 | 1 | 1 | 1 | 1 | 0 |
| B to G | BCDEFG | | | | 0 | 1 | 1 | 1 | 1 | 1 |
| C to D | CD | | | | 0 | 0 | 1 | 0 | 0 | 0 |
| C to E | CDE | | | | 0 | 0 | 1 | 1 | 0 | 0 |
| C to F | CDEF | | | | 0 | 0 | 1 | 1 | 1 | 0 |
| C to G | CDEFG | | | | 0 | 0 | 1 | 1 | 1 | 1 |
| D to E | DE | | | | 0 | 0 | 0 | 1 | 0 | 0 |
| D to F | DEF | | | | 0 | 0 | 0 | 1 | 1 | 0 |
| D to G | DEFG | | | | 0 | 0 | 0 | 1 | 1 | 1 |
| E to F | EF | | | | 0 | 0 | 0 | 0 | 1 | 0 |
| E to G | EFG | | | | 0 | 0 | 0 | 0 | 1 | 1 |
| F to G | FG | | | | 0 | 0 | 0 | 0 | 0 | 1 |
| | | | | TOTALS | 6 | 10 | 12 | 12 | 10 | 6 |

| Pass if Total Path Performance Penalty no greater than 6 | | | | | | | | | | |
|---|---|---|---|---|---|---|---|---|---|---|
| | | | | | Total Occurrences of Spans Within Degraded Optical Paths (Failed Spans) | | | | | |
| Connection | Path 1 | Path 2 | Path 3 | Path 3 | AB | BC | CD | DE | EF | FG |
| A to B | AB | | | | 0 | 0 | 0 | 0 | 0 | 0 |
| A to C | ABC | | | | 0 | 0 | 0 | 0 | 0 | 0 |
| A to D | ABCD | | | | 0 | 0 | 0 | 0 | 0 | 0 |
| A to E | *ABCDE* | | | | 1 | 1 | 1 | 1 | 0 | 0 |
| A to F | *ABCDEF* | | | | 1 | 1 | 1 | 1 | 1 | 0 |
| A to G | *ABCDEFG* | | | | 1 | 1 | 1 | 1 | 1 | 1 |
| B to C | BC | | | | 0 | 0 | 0 | 0 | 0 | 0 |
| B to D | BCD | | | | 0 | 0 | 0 | 0 | 0 | 0 |
| B to E | *BCDE* | | | | 0 | 1 | 1 | 1 | 0 | 0 |
| B to F | *BCDEF* | | | | 0 | 1 | 1 | 1 | 1 | 0 |
| B to G | *BCDEFG* | | | | 0 | 1 | 1 | 1 | 1 | 1 |
| C to D | CD | | | | 0 | 0 | 0 | 0 | 0 | 0 |
| C to E | *CDE* | | | | 0 | 0 | 1 | 1 | 0 | 0 |
| C to F | *CDEF* | | | | 0 | 0 | 1 | 1 | 1 | 0 |
| C to G | *CDEFG* | | | | 0 | 0 | 1 | 1 | 1 | 1 |
| D to E | DE | | | | 0 | 0 | 0 | 0 | 0 | 0 |
| D to F | *DEF* | | | | 0 | 0 | 0 | 1 | 1 | 0 |
| D to G | *DEFG* | | | | 0 | 0 | 0 | 1 | 1 | 1 |
| E to F | EF | | | | 0 | 0 | 0 | 0 | 0 | 0 |
| E to G | EFG | | | | 0 | 0 | 0 | 0 | 0 | 0 |
| F to G | FG | | | | 0 | 0 | 0 | 0 | 0 | 0 |
| | | | | TOTALS | 3 | 6 | 9 | 11 | 8 | 4 |

FIG.11C

| SPANS | α | Total Spans Tested | Total Spans Failed | Total Spans Passed | Pass % |
|---|---|---|---|---|---|
| AB | 1 | 6 | 3 | 3 | 50 |
| BC | 1 | 10 | 6 | 4 | 40 |
| CD | 1 | 12 | 9 | 3 | 25 |
| DE | 6 | 12 | 11 | 1 | 8 |
| EF | 1 | 10 | 8 | 2 | 20 |
| FG | 1 | 6 | 4 | 2 | 33 |

FIG.11D

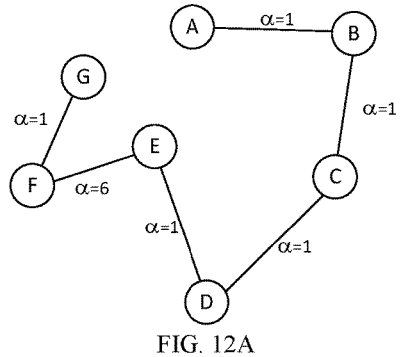

FIG. 12A

| Pass if Total Path Performance Penalty no greater than 6 | | | | | | | | | | |
|---|---|---|---|---|---|---|---|---|---|---|
| | | | | | Total Occurrences of Spans Within Degraded Optical Paths (Failed Spans) | | | | | |
| Connection | Path 1 | Path 2 | Path 3 | Path 3 | AB | BC | CD | DE | EF | FG |
| A to B | AB | | | | 0 | 0 | 0 | 0 | 0 | 0 |
| A to C | ABC | | | | 0 | 0 | 0 | 0 | 0 | 0 |
| A to D | ABCD | | | | 0 | 0 | 0 | 0 | 0 | 0 |
| A to E | ABCDE | | | | 0 | 0 | 0 | 0 | 0 | 0 |
| A to F | *ABCDEF* | | | | 1 | 1 | 1 | 1 | 1 | |
| A to G | *ABCDEFG* | | | | 1 | 1 | 1 | 1 | 1 | 1 |
| B to C | BC | | | | 0 | 0 | 0 | 0 | 0 | 0 |
| B to D | BCD | | | | 0 | 0 | 0 | 0 | 0 | 0 |
| B to E | BCDE | | | | 0 | 0 | 0 | 0 | 0 | 0 |
| B to F | *BCDEF* | | | | 0 | 1 | 1 | 1 | 1 | |
| B to G | *BCDEFG* | | | | 0 | 1 | 1 | 1 | 1 | 1 |
| C to D | CD | | | | 0 | 0 | 0 | 0 | 0 | 0 |
| C to E | CDE | | | | 0 | 0 | 0 | 0 | 0 | 0 |
| C to F | *CDEF* | | | | 0 | 0 | 1 | 1 | 1 | 0 |
| C to G | *CDEFG* | | | | 0 | 0 | 1 | 1 | 1 | 1 |
| D to E | DE | | | | 0 | 0 | 0 | 0 | 0 | 0 |
| D to F | *DEF* | | | | 0 | 0 | 0 | 1 | 1 | 0 |
| D to G | *DEFG* | | | | 0 | 0 | 0 | 1 | 1 | 1 |
| E to F | EF | | | | 0 | 0 | 0 | 0 | 0 | 0 |
| E to G | *EFG* | | | | 0 | 0 | 0 | 0 | 1 | 1 |
| F to G | FG | | | | 0 | 0 | 0 | 0 | 0 | 0 |
| | | | | TOTALS | 2 | 4 | 6 | 8 | 9 | 5 |

FIG. 12B

| SPANS | α | Total Spans Tested | Total Spans Failed | Total Spans Passed | Pass Percentage |
|---|---|---|---|---|---|
| AB | 1 | 6 | 2 | 4 | 67 |
| BC | 1 | 10 | 4 | 6 | 60 |
| CD | 1 | 12 | 6 | 6 | 50 |
| DE | 1 | 12 | 8 | 4 | 33 |
| EF | 6 | 10 | 9 | 1 | 10 |
| FG | 1 | 6 | 5 | 1 | 17 |

FIG. 12C

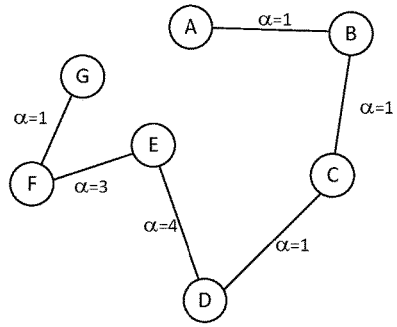

FIG. 13A

| Pass if Total Path Performance Penalty no greater than 6 | | | | | | | | | | |
|---|---|---|---|---|---|---|---|---|---|---|
| | | | | | Total Occurrences of Spans Within Degraded Optical Paths (Failed Spans) | | | | | |
| Connection | Path 1 | Path 2 | Path 3 | Path 3 | AB | BC | CD | DE | EF | FG |
| A to B | AB | | | | 0 | 0 | 0 | 0 | 0 | 0 |
| A to C | ABC | | | | 0 | 0 | 0 | 0 | 0 | 0 |
| A to D | ABCD | | | | 0 | 0 | 0 | 0 | 0 | 0 |
| A to E | *ABCDE* | | | | 1 | 1 | 1 | 1 | 0 | 0 |
| A to F | *ABCDEF* | | | | 1 | 1 | 1 | 1 | 1 | 0 |
| A to G | *ABCDEFG* | | | | 1 | 1 | 1 | 1 | 1 | 1 |
| B to C | BC | | | | 0 | 0 | 0 | 0 | 0 | 0 |
| B to D | BCD | | | | 0 | 0 | 0 | 0 | 0 | 0 |
| B to E | *BCDE* | | | | 0 | 1 | 1 | 1 | 0 | 0 |
| B to F | *BCDEF* | | | | 0 | 1 | 1 | 1 | 1 | 0 |
| B to G | *BCDEFG* | | | | 0 | 1 | 1 | 1 | 1 | 1 |
| C to D | CD | | | | 0 | 0 | 0 | 0 | 0 | 0 |
| C to E | CDE | | | | 0 | 0 | 0 | 0 | 0 | 0 |
| C to F | *CDEF* | | | | 0 | 0 | 1 | 1 | 1 | 0 |
| C to G | *CDEFG* | | | | 0 | 0 | 1 | 1 | 1 | 1 |
| D to E | DE | | | | 0 | 0 | 0 | 0 | 0 | 0 |
| D to F | *DEF* | | | | 0 | 0 | 0 | 1 | 1 | 0 |
| D to G | *DEFG* | | | | 0 | 0 | 0 | 1 | 1 | 1 |
| E to F | EF | | | | 0 | 0 | 0 | 0 | 0 | 0 |
| E to G | EFG | | | | 0 | 0 | 0 | 0 | 0 | 0 |
| F to G | FG | | | | 0 | 0 | 0 | 0 | 0 | 0 |
| | | | | TOTALS | 3 | 6 | 8 | 10 | 8 | 4 |

FIG. 13B

| SPANS | $\alpha$ | Total Spans Failed | Total Spans Failed | Total Spans Passed | Pass % |
|---|---|---|---|---|---|
| AB | 1 | 6 | 3 | 3 | 50 |
| BC | 1 | 10 | 6 | 4 | 40 |
| CD | 1 | 12 | 8 | 4 | 33 |
| DE | 4 | 12 | 10 | 2 | 17 |
| EF | 3 | 10 | 8 | 2 | 20 |
| FG | 1 | 6 | 4 | 2 | 33 |

FIG. 13C

|  | Path and Path Metric of Performance | | | | Span Metric of Performance | | | | | |
|---|---|---|---|---|---|---|---|---|---|---|
| Connection | Path 1 | Path 2 | Path 3 | Path 4 | AB | BC | AC | AE | CD | DE |
| A to B | AB=1 | ACB=1 | AEDCB=1 |  | 1 | 1,1 | 1 | 1 | 1 | 1 |
| A to C | AC=1 | ABC=1 | AEDC=1 |  | 1 | 1 | 1 | 1 | 1 | 1 |
| A to D | AED=1 | ACD=1 | *ABCD=2* |  | 2 | 2 | 1 | 1 | 1,2 | 1 |
| A to E | AE=1 | ACDE=1 | *ABCDE=3* |  | 3 | 3 | 1 | 1 | 1,3 | 1,3 |
| B to C | BC=1 | BAC=1 | *BAEDC=3* |  | 1,3 | 1 | 1 | 3 | 3 | 3 |
| B to D | BCD=1 | BCAED=1 | *BACD=2* | *BAED=2* | 2,2 | 1,1 | 1,2 | 1,2 | 1,2 | 2,1 |
| B to E | BAE=1 | *BACDE=3* | BCDE=1 | BCAE=1 | 1,3 | 1,1 | 1,3 | 1,1 | 1,3 | 1,3 |
| C to D | CD=1 | CAED=1 | *CBAED=3* |  | 3 | 3 | 1 | 1,3 | 1 | 1,3 |
| C to E | CDE=1 | CAE=1 | *CBAE=2* |  | 2 | 2 | 1 | 1,2 | 1 | 1 |
| D to E | DE=1 | DCAE=1 | *DCBAE=3* |  | 2 | 3 | 1 | 1,3 | 1,3 | 1 |
|  |  |  |  | TOTAL | 26 | 21 | 15 | 23 | 25 | 23 |
|  |  |  | Span Average Metric of Performance | | 2.00 | 1.62 | 1.25 | 1.53 | 1.67 | 1.64 |

FIG.14

|  | Path and Path Metric of Performance | | | | Span Metric of Performance | | | | | |
|---|---|---|---|---|---|---|---|---|---|---|
| Connection | Path 1 | Path 2 | Path 3 | Path 4 | AB | BC | AC | AE | CD | DE |
| A to B | AB=0 | ACB=0 | AEDCB=0 |  | 0 | 0,0 | 0 | 0 | 0 | 0 |
| A to C | AC=0 | ABC=0 | AEDC=0 |  | 0 | 0 | 0 | 0 | 0 | 0 |
| A to D | AED=0 | ACD=0 | *ABCD=1* |  | 1 | 1 | 0 | 0 | 0,1 | 0 |
| A to E | AE=0 | ACDE=0 | *ABCDE=1* |  | 1 | 1 | 0 | 0 | 0,1 | 0,1 |
| B to C | BC=0 | BAC=0 | *BAEDC=1* |  | 0,1 | 0 | 0 | 1 | 1 | 1 |
| B to D | BCD=0 | BCAED=0 | *BACD=1* | *BAED=1* | 1,1 | 0,0 | 0,1 | 0,1 | 0,1 | 1,0 |
| B to E | BAE=0 | *BACDE=1* | BCDE=0 | BCAE=0 | 0,1 | 0,0 | 0,1 | 0,0 | 0,1 | 0,1 |
| C to D | CD=0 | CAED=0 | *CBAED=1* |  | 1 | 1 | 0 | 0,1 | 0 | 0,1 |
| C to E | CDE=0 | CAE=0 | *CBAE=1* |  | 1 | 1 | 0 | 0,1 | 0 | 0 |
| D to E | DE=0 | DCAE=0 | *DCBAE=1* |  | 1 | 1 | 0 | 0,1 | 0,1 | 0 |
|  |  |  |  | TOTAL | 9 | 5 | 2 | 5 | 6 | 5 |
|  |  |  | Span Average Metric of Performance | | 0.69 | 0.38 | 0.17 | 0.33 | 0.43 | 0.36 |

FIG.15

METHODS AND APPARATUS FOR USING AN EMBEDDED OPTICAL SIGNAL SOURCE WITHIN AN OPTICAL NODE TO LOCATE PROBLEMATIC OPTICAL SPANS

RELATED APPLICATION

This application claims the benefit of: U.S. Provisional Application No. 62/235,611, filed on Oct. 1, 2015.

SUMMARY

Methods and apparatus according to the principles of the present invention can be used in identifying optical spans with degraded performance within a network of nodes interconnected by optical spans.

A first method of identifying problematic optical spans is presented. The first method of identifying problematic optical spans includes: identifying optical paths between network nodes, testing the identified optical paths between network nodes, identifying degraded optical paths between network nodes based upon the testing, counting occurrences of each optical span within the degraded optical paths between network nodes to create a total for each optical span, counting occurrences of each optical span within the identified optical paths between network nodes to create a second total for each optical span, and comparing optical spans using the total for each optical span. The first method of identifying problematic optical spans further includes dividing the total for each optical span by the second total for each optical span to create a third total for each optical span, where comparing optical spans using the total for each optical span includes comparing the third total for each optical span. The first method of identifying problematic optical spans further includes dividing the second total for each optical span by the total for each optical span to create a third total for each optical span, where comparing optical spans using the total for each optical span includes comparing the third total for each optical span. The first method of identifying problematic optical spans further includes subtracting the total for each optical span from the second total for each optical span to create a third total for each optical span, where comparing optical spans using the total for each optical span includes comparing the third total for each optical span. The first method of identifying problematic optical spans further includes: subtracting the total for each optical span from the second total for each optical span to create a third total for each optical span, and dividing the third total for each optical span by the second total for each optical span to create a fourth total for each optical span, where comparing optical spans using the total for each optical span includes comparing the fourth total for each optical span. The first method of identifying problematic optical spans further includes: subtracting the total for each optical span from the second total for each optical span to create a third total for each optical span, and dividing the second total for each optical span by the third total for each optical span to create a fourth total for each optical span, where comparing optical spans using the total for each optical span includes comparing the fourth total for each optical span.

The method of testing the identified optical paths between network nodes used in the first method of identifying problematic optical spans includes a first method of testing the identified optical paths between network nodes. The first method of testing the identified optical paths between network nodes includes: tuning the output of an optical transmitter embedded within a first reconfigurable optical add-drop multiplexer circuit pack of a first optical node to a wavelength within a band of wavelengths, generating a test signal over the wavelength, forwarding the wavelength to an optical path, receiving the wavelength from the optical path at a second reconfigurable optical add-drop multiplexer circuit pack of a second optical node, and recording a performance of the test signal at the second reconfigurable optical add-drop multiplexer circuit pack using an optical receiver embedded within the second reconfigurable optical add-drop multiplexer circuit pack. The first method of testing the identified optical paths between network nodes further includes: configuring the first reconfigurable optical add-drop multiplexer circuit pack to forward the wavelength to the optical path, and configuring the second reconfigurable optical add-drop multiplexer circuit pack to forward the wavelength to the optical receiver. The first method of testing the identified optical paths between network nodes may be performed with the first reconfigurable optical add-drop multiplexer circuit pack including a port used to connect to an optical multiplexer that is operable to only receive wavelengths of a second band of wavelengths, where the second band of wavelengths is smaller than the band of wavelengths.

The method of testing the identified optical paths between network nodes used in the first method of identifying problematic optical spans includes a second method of testing the identified optical paths between network nodes. The second method of testing the identified optical paths between network nodes includes: generating a signal along the optical paths, and identifying those optical paths that exceed a defined performance threshold as degraded optical paths. The second method of testing the identified optical paths between network nodes further includes: generating the signal along the optical paths using an optical transmitter internal to a first reconfigurable optical add-drop multiplexer, and identifying those optical paths that exceed the defined performance threshold using an optical receiver internal to a second reconfigurable optical add-drop multiplexer.

The method of testing the identified optical paths between network nodes used in the first method of identifying problematic optical spans includes a third method of testing the identified optical paths between network nodes. The third method of testing the identified optical paths between network nodes includes: generating a signal along the optical paths, and identifying those optical paths that exceed a bit error rate threshold as degraded optical paths, where the bit error rate threshold is based upon a first bit error rate determined prior to forward error correction, or a second bit error rate determined following minimal forward error correction, or a third bit error rate determined following maximum forward error correction.

A second method of identifying problematic optical spans is presented. The second method of identifying problematic optical spans includes: identifying optical paths between network nodes, testing the identified optical paths between network nodes, identifying the nondegraded optical paths between network nodes based upon testing, counting occurrences of each optical span within the nondegraded optical paths between network nodes to create a total for each optical span, counting occurrences of each optical span within identified optical paths between network nodes to create a second total for each optical span, and comparing optical spans using the total for each optical span. The second method of identifying problematic optical spans further includes dividing the total for each optical span by the second total for each optical span to create a third total for each optical span, where comparing optical spans using the total for each optical span includes comparing the third total for each optical span. The second method of identifying problematic optical spans further includes dividing the second total for each optical span by the total for each optical span to create a third total for each optical span, where comparing the optical spans using the total for each optical span includes comparing the third total for each optical span. The second method of identifying problematic optical spans further includes subtracting the total for each optical span from the second total for each optical span to create a third total for each optical span, where comparing optical spans using the total for each optical span includes comparing the third total for each optical span. The second method of identifying problematic optical spans further includes: subtracting the total for each optical span from the second total for each optical span to create a third total for each optical span, and dividing the third total for each optical span by the second total for each optical span to create a fourth total for each optical span, where comparing optical spans using the total for each optical span includes comparing the fourth total for each optical span. The second method of identifying problematic optical spans further includes: subtracting the total for each optical span from the second total for each optical span to create a third total for each optical span, and dividing the second total for each optical span by the third total for each optical span to create a fourth total for each optical span, where comparing optical spans using the total for each optical span includes comparing the fourth total for each optical span.

A method of identifying a problematic optical span between two optical nodes is presented. The method of identifying a problematic optical span between two optical nodes includes: tuning the output of an optical transmitter embedded within a first reconfigurable optical add-drop multiplexer circuit pack of a first optical node to a wavelength within a band of wavelengths, generating a test signal over the wavelength, forwarding the wavelength onto an optical span, stressing the test signal, receiving the wavelength after the optical span at a second reconfigurable optical add-drop multiplexer circuit pack of a second optical node, recording a performance of the test signal using an optical receiver embedded within the second reconfigurable optical add-drop multiplexer circuit pack, and comparing the recorded performance of the test signal to a measure of performance. The method further includes methods of stressing the test signal by operating absent of forward error correction, or by operating with minimal forward error correction, or by testing the optical span with other optical spans, or by attenuating an optical power level of the wavelength using the second reconfigurable optical add-drop multiplexer circuit pack.

A method of testing optical paths originating at an optical node is presented. The method includes: tuning the output of an optical transmitter embedded within a first reconfigurable optical add-drop multiplexer circuit pack of a first optical node to a wavelength within a band of wavelengths, generating a test signal over the wavelength, configuring the first reconfigurable optical add-drop multiplexer circuit pack to forward the wavelength out of a first optical degree onto an optical path, receiving the wavelength with the test signal from the optical path at a second reconfigurable optical add-drop multiplexer circuit pack of a second optical node, configuring the second reconfigurable optical add-drop multiplexer circuit pack to forward the wavelength with the test signal to an optical receiver embedded within the second reconfigurable optical add-drop multiplexer circuit pack, and recording a performance of the test signal at the second reconfigurable optical add-drop multiplexer circuit pack. The method further includes: tuning the output of the optical transmitter to a second wavelength within the band of wavelengths, generating a second test signal over the second wavelength, configuring the first reconfigurable optical add-drop multiplexer circuit pack to forward the second wavelength out of a second optical degree onto a second optical path, receiving the second wavelength with the second test signal from the second optical path at a third reconfigurable optical add-drop multiplexer circuit pack of a third optical node, configuring the third reconfigurable optical add-drop multiplexer circuit pack to forward the second wavelength with the second test signal to a second optical receiver embedded within the third reconfigurable optical add-drop multiplexer circuit pack, and recording a second performance of the second test signal at the third reconfigurable optical add-drop multiplexer circuit pack. The wavelength used in the method may have a first frequency and the second wavelength used in the method may have a second frequency, where the second frequency may be equal to the first frequency, or the second frequency may not be equal to the first frequency.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIG. 5A depicts a mesh network diagram.
FIG. 5B is a first example mesh network diagram.
FIG. 5C is a table that describes the optical paths through the first example mesh network.
FIG. 5D is a table describing the degraded optical paths and their associated spans within the first example mesh network.
FIG. 5E is a table summarizing the identification of problematic span AB of the first example mesh network.
FIG. 6A is a second example mesh network diagram.
FIG. 6B is a table describing the degraded optical paths and their associated spans within the second example mesh network.
FIG. 6C is a table summarizing the identification of problematic span DE of the second example mesh network.
FIG. 7A is a third example mesh network diagram.
FIG. 7B is a table describing the degraded optical paths and their associated spans within the third example mesh network.

FIG. 7C is a table summarizing the identification of problematic span AC of the third example mesh network.

FIG. 8A is a fourth example mesh network diagram.

FIG. 8B is a table describing the degraded optical paths and their associated spans within the fourth example mesh network.

FIG. 8C is a table summarizing the identification of problematic spans AB and BC of the fourth example mesh network.

FIG. 9A is a fifth example mesh network diagram.

FIG. 9B is a table describing the degraded optical paths and their associated spans within the fifth example mesh network.

FIG. 9C is a table summarizing the identification of problematic span DE of the fifth example mesh network.

FIG. 10A is an example ring network diagram.

FIG. 10B is a table that describes the optical paths through the example ring network.

FIG. 10C is a table describing the degraded optical paths and their associated spans within the example ring network.

FIG. 10D is a table summarizing the identification of problematic span DE of the example ring network.

FIG. 11C is a table describing the degraded optical paths and their associated spans within the first example linear network.

FIG. 11D is a table summarizing the identification of problematic span DE of the first example linear network.

FIG. 12A is a second example linear network diagram.

FIG. 12B is a table describing the degraded optical paths and their associated spans within the second example linear network.

FIG. 12C is a table summarizing the identification of problematic span EF of the second example linear network.

FIG. 13A is a third example linear network diagram.

FIG. 13B is a table describing the degraded optical paths and their associated spans within the third example linear network.

FIG. 13C is a table summarizing the identification of problematic spans DE and EF of the third example linear network.

FIG. 14 is a table depicting the results of analyzing the network of FIG. 5B using three thresholds and three metrics of performance for the paths.

FIG. 15 is a table depicting the results of analyzing the network of FIG. 5B using one threshold and one metric of performance for the paths.

DETAILED DESCRIPTION

Figure 1A:
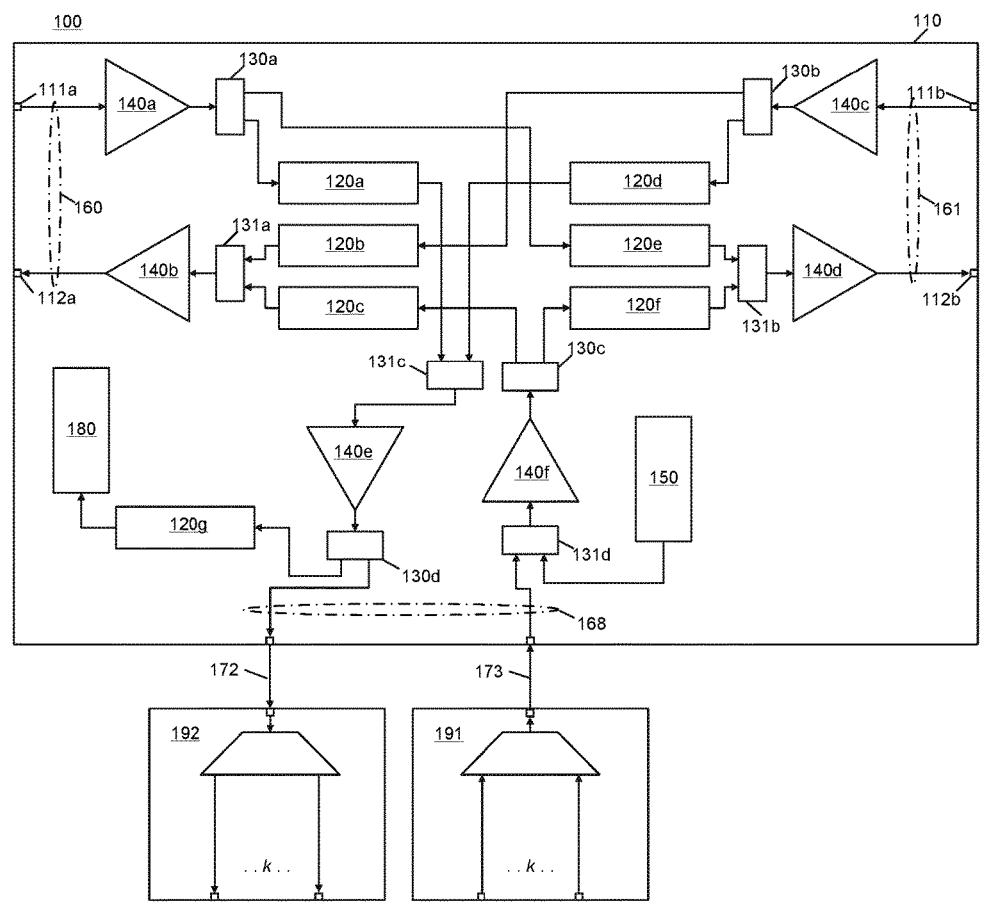
FIG. 1A is an illustration of a two degree optical node.

FIG. 1A depicts a two degree optical node 100 comprising a first reconfigurable optical add-drop multiplexer (ROADM) 110, an optical multiplexer 191, and an optical demultiplexer 192.

The optical multiplexer 191 of FIG. 1A comprises k number of optical add ports, an optical wavelength multiplexer connected to the k number of optical add ports, and an optical multiplexer common port connected to the optical wavelength multiplexer, wherein the optical multiplexer common port is connected to the ROADM common port 168 via optical fiber jumper cable 173.

The optical demultiplexer 192 of FIG. 1A comprises k number of optical drop ports, an optical wavelength demultiplexer connected to the k number of optical drop ports, and an optical demultiplexer common port connected to the optical wavelength demultiplexer, wherein the optical demultiplexer common port is connected to the ROADM common port 168 via optical fiber jumper cable 172.

The optical multiplexer 191 and optical demultiplexer 192 may comprise of colored add ports and colored drop ports, or they may comprise of colorless add ports and colorless drop ports. A colored port only supports a single predetermined wavelength having a single predetermined carrier frequency (wherein, Wavelength=Fiber_Speed_of_Light/Frequency), while a colorless port may support a set of wavelengths within a standards body defined band of wavelengths. The standards body defined band of wavelengths may be a band defined by the International Telecommunication Union (ITU), such as the C-band or L-band (discussed in ITU document ITU-T G.694.1), or the band of wavelengths may a subset of a band defined by the ITU (such as a subset of the C-band).

The ROADM functionality 110 may be placed on a circuit pack, creating a ROADM circuit back. The ROADM comprises two optical degrees 160 - 161, six optional optical amplifiers 140a-f, seven wavelength equalizers 120a-g, four 1:2 optical couplers 130a-d, four 2:1 optical couplers 131a-d, an embedded optical transmitter 150, and an embedded optical receiver 180. The first optical degree 160 is used to optically interconnect to a second optical node, and comprises an input optical interface (optical port) 111a, and an output optical interface (optical port) 112a. The second optical degree 161 is used to optically interconnect to a third optical node, and comprises an input optical interface (optical port) 111b, and an output optical interface (optical port) 112b. The ROADM has an optical common port 168 used to optically connect to the optical multiplexer 191 via optical fiber jumper cable 173, and used to optically connect to the optical demultiplexer 192 via optical fiber jumper cable 172.

Figure 1B:
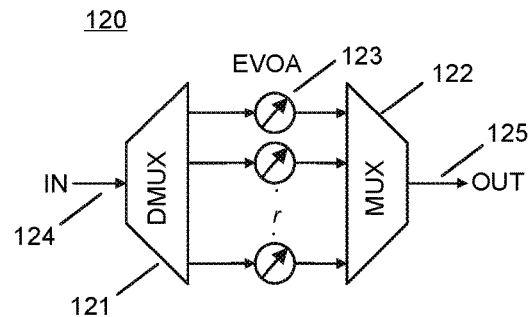
FIG. 1B is an illustration of a wavelength equalizer.

FIG. 1B illustrates a wavelength equalizer 120. The wavelength equalizer 120 comprises: a single optical input 124, an optical demultiplexer 121 used to demultiplex a wavelength division multiplexed (WDM) optical signal into an r number of individual optical wavelengths, an r number of electronically variable optical attenuators (EVOAs) 123 used to optically pass and block and variably attenuate individual wavelengths, an optical wavelength multiplexer 122 used to multiplex an r number of individual wavelengths into a single WDM optical signal, and a single optical output 125.

The wavelength equalizer 120 contains electronic circuitry (not shown) used to control the EVOAs, and a user interface (not shown) that is used to program the electronic circuitry of the EVOAs. The optical processing of each individual wavelength may be independently controlled. The optical power level of each individual wavelength may be attenuated by a programmable amount by sending a command through the user interface. The command is used by the electronic circuitry to set the attenuation value of the appropriate EVOA. Additionally, each individual EVOA can be program to substantially block the light associated with an incoming optical wavelength. Controlled attenuation ranges for typical EVOAs are 0 to 15 decibels, or 0 to 25 decibels. Blocking attenuation is typically 35 decibels or 40 decibels.

The device 120 is referred to as a wavelength equalizer because the EVOAs 123 can be used to equalize the power levels of all the wavelengths inputted into the device. Therefore, if wavelengths with unequal power levels are applied to input 124, the EVOAs can be configured so that the wavelengths exiting at 125 have substantially the same optical power level with respect to one another. The device 120 is also often referred to as a wavelength blocker, or as a one-by-one wavelength selective switch.

The wavelength equalizers 120a-g of FIG. 1A can be the same as—for example—the wavelength equalizer 120 shown in FIG. 1B, although they are not limited thereto.

Figure 1C:
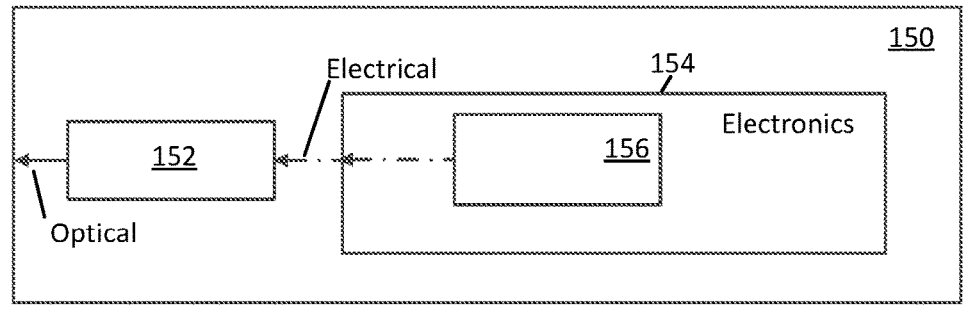
FIG. 1C is an illustration of an optical transmitter.

FIG. 1C illustrates an optical transmitter 150 according to one embodiment of the present invention. The optical transmitter comprises a tunable laser & modulator 152 and transmitter electronics 154. The transmitter electronics 154 includes a pattern generator 156. The tunable laser is able to be configured (tuned) to a wavelength within a band of wavelengths. The carrier frequency of the laser is modulated using an electrical signal applied to the modulator. This electrical signal may be referred to as a test signal. The pattern generator 156 may be used to apply the electrical test signal to the modulator. This process may be referred to as "generating a test signal over the carrier frequency of the wavelength" or simply as "generating a test signal over the wavelength". The pattern of the pattern generator may be a pseudo random pattern of some predetermined length.

The optical transmitter 150 of FIG. 1A can be the same as—for example—the optical transmitter 150 shown in FIG. 1C, although it is not limited thereto.

Figure 1D:
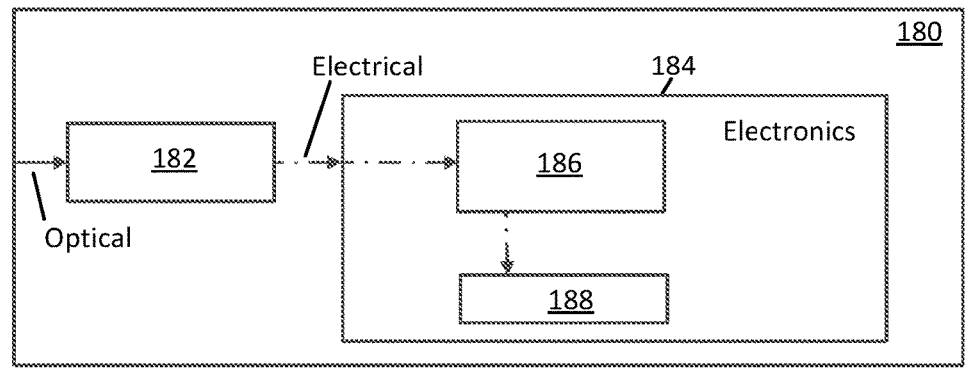
FIG. 1D is an illustration of an optical receiver.

FIG. 1D illustrates an optical receiver 180 according to the present invention. The optical receiver comprises a broadband optical receiver 182 and receiver electronics 184. The receiver electronics include a pattern checker 186 and a bit error rate (BER) register 188. The broadband receiver may be used to recover the test signal from any wavelength in the band of wavelengths tunable by the optical transmitter 150. For a non-coherent receiver, only a single wavelength may be applied to the broadband optical receiver 182. The recovered test signal from the broadband optical receiver is forwarded to a pattern checker 186, used to check the pattern of the test signal to the pattern used to generate the test signal at an optical transmitter. Any bit errors detected in the pattern are recorded in the bit error rate register 188.

The optical receiver 180 of FIG. 1A can be the same as—for example—the optical receiver 180 shown in FIG. 1D, although it is not limited thereto.

Figure 1E:
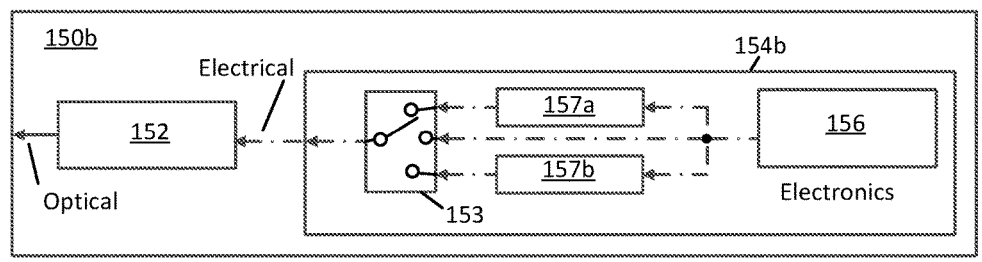
FIG. 1E is an illustration of an optical transmitter.

The transmitter electronics 154 may optionally include circuitry (not shown) used to generate forward error correction (FEC) overhead bits. FIG. 1E illustrates an optical transmitter 150b having the ability to add forward error correction overhead bits to the electrical pattern generated by the pattern generator 156 within the optical transmitter 150b. The forward error correction overhead bits are encoded such that an optical receiver equipped with the ability to correct bit errors can use the information within the forward error correction overhead bits to detect and correct bit errors in the electrical pattern received by the optical receiver. Bit errors may be incurred in the transmission path between the optical transmitter and optical receiver. The optical transmitter 150b comprises a tunable laser & modulator 152, and electronics 154b. The electronics 154b comprise a pattern generator 156, a first forward error correction encoder 157a, a second forward error correction encoder 157b, and a three to one electrical switch 153. The optical transmitter electronics 154b may include the functionality to generate more than one type of forward error correction. For instance, the transmitter electronics may include the ability to generate a set of forward error correction overhead bits corresponding to a minimal forward error correction, and the transmitter electronics may include the ability to generate a set of forward error correction overhead bits corresponding to a forward error correction that corrects for a greater number of bit errors than that corrected by the minimal forward error correction (e.g., maximum forward error correction). Within 154b, the electrical block 157a may be used to generate the overhead bits needed to encode a first level of forward error correction (for example, a minimal forward error correction), while electrical block 157b may be used to generate the overhead bits needed to encode a second level of forward error correction (for example, a forward error correction that corrects for a greater number of bit errors than that corrected by the minimal forward error correction—e.g., maximum forward error correction). The bit pattern generated by the pattern generator 156 is forwarded to the first level forward error correction encoder 157a, the second level forward error correction encoder 157b, and one input of the three to one electrical switch 153. The electrical switch 153 may be configured to select the output of the first level forward error correction encoder 157a, or it may be configured to select the output of the second level forward error correction encoder 157b, or it may be configured to select the output of the pattern generator 156 (no forward error correction encoding). The bits of the electrical pattern and the forward error correction overhead bits are both forwarded to the tunable laser & modulator 152 in order to transmit both types of bits.

The optical transmitter 150 of FIG. 1A can be the same as—for example—the optical transmitter 150b shown in FIG. 1E, although it is not limited thereto.

The receiver electronics 184 may optionally include circuitry (not shown) used to process forward error correction (FEC) overhead bits used to correct for bit errors incurred over a transmission media. For this case, the bits of the electrical pattern and the forward error correction overhead bits are first forwarded to receiver circuitry that corrects for bit errors, and then the corrected bit stream is forwarded to the pattern checker 186. The receiver electronics may include the functionality to operate with more than one type of forward error correction. For instance, the receiver electronics may include the ability to correct bit errors corresponding to a minimal forward error correction (first level forward error correction), and the receiver electronics may include the ability to correct bit errors corresponding to a forward error correction that corrects for a greater number of bit errors than that corrected by the minimal forward error correction (e.g., maximum forward error correction, or second level forward error correction).

An optical receiver 180b capable of correcting bit errors for two levels of forward error correction as discussed above is illustrated in FIG. 1F. Optical receiver 180b comprises a broadband optical receiver 182 and receiver electronics 184b. The receiver electronics 184b comprises a pattern checker 186, a bit error rate register 188, a three to one electrical switch 183, a first level forward error correction decoder 187a, and a second level forward error correction decoder 187b. The first level forward error correction decoder 187a may be used to correct for a minimal forward error correction, while the second level forward error correction decoder 187b may be used to correct for a greater number of bit errors than that corrected by the minimal forward error correction (e.g., maximum forward error correction). The output of the broadband receiver 182 is forwarded to the first level forward error correction decoder 187a, and to the second level forward error correction decoder 187b, and to one input of the electrical switch 183. The electrical switch 183 may be configured by software control to select a bit pattern from the first level forward error correction decoder 187a, or from the second level forward error correction decoder 187b, or directly from the broadband receiver (an uncorrected bit pattern).

When sending a test signal from an optical transmitter 150b to an optical receiver 180b, the level of forward error correction at the optical receiver is normally set to the same level of forward error correction that is set at the optical transmitter. One may use the first level of forward error correction over the second level of forward error correction in order to utilize a bit stream operating at a lower bit rate, or one may use the first level of forward error correction over the second level of forward error correction in order to minimize transmission delays through the forward error correction decoder.

Figure 1F:
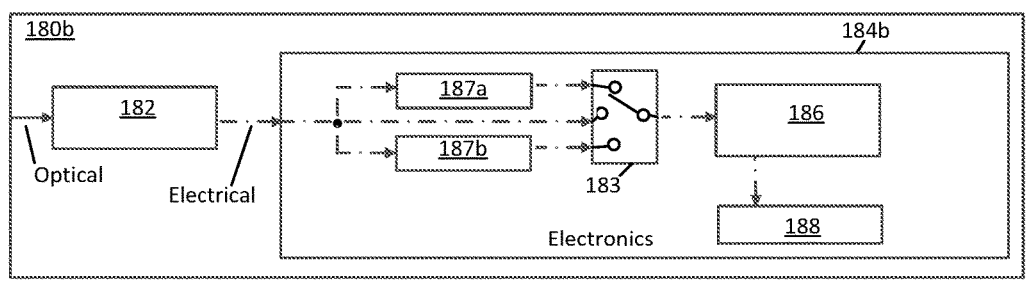
FIG. 1F is an illustration of an optical receiver.

The optical receiver 180 of FIG. 1A can be the same as—for example—the optical receiver 180b shown in FIG. 1F, although it is not limited thereto.

The tunable laser within the tunable laser & modulator block 152 of the optical transmitter 150/150b is tunable to a wavelength within a band of wavelengths, while the common port 168 (connected to the optical multiplexer 191 and optical demultiplexer 192) of the ROADM 110 may be restricted to support only a second band of wavelengths, wherein the band of wavelengths is larger than the second band of wavelengths. (In other words, a port 168 of the ROADM 110 used to connect to an optical multiplexer 191 may be operable to only receive the wavelengths of a second band of wavelengths, wherein the second band of wavelengths is smaller than the band of wavelengths.) For example, the second band of wavelengths may comprise of forty (40) wavelengths having forty (40) distinct carrier frequencies, each separated in frequency by 100 GHz (such as 190200 GHz to 194100 GHz), while the band of wavelengths may comprise of forty-one (41) distinct carrier frequencies, each separated in frequency by 100 GHz (such as 190100 GHz to 194100 GHz, or 190200 GHz to 194200 GHz). For this case, the carrier frequency of the additional wavelength supported by the tunable laser of the optical transmitter 150/150b is separated by 100 GHz from the second band of wavelengths (either 100 GHz higher or 100 GHz lower). Both the band of wavelengths and the second band of wavelengths are typically smaller than a given ITU defined band of wavelengths. For example, the C-band (as defined by ITU) comprises over seventy (70) distinct carrier frequencies (with 100 GHz spacing), while a typical 100 GHz based dense wavelength division multiplexed (DWDM) system (ROADM) may support less than fifty (50) distinct carrier frequencies. In a modern DWDM system (ROADM), it's usually the optical power capabilities of the optical amplifiers 140a-f that limit the number of distinct carrier frequencies supported by the system (ROADM). For instance, each optical amplifier 140a-g may only have enough total output power to support 41 distinct carrier frequencies onto an optical fiber at a specified output power level for each wavelength. The wavelength equalizers 120a-g, on the other hand, may be capable of supporting all 72 of the 100 GHz spaced distinct carrier frequencies of the C-band. Therefore, usually software within the system (ROADM) is used to limit the number of wavelengths (distinct carrier frequencies) allowed to be applied to the input port of the common port 168 by an optical multiplexer 191. It should also be noted that each optical amplifier usually employs a gain flattening filter which has the effect of hardware restricting the number of distinct carrier frequencies that can be amplified. Because of the gain flattening filter, the addition wavelength within the band of wavelengths (compared to the second band of wavelengths) resides just outside of the second band of wavelengths. For example, for a 100 GHz spaced DWDM system (ROADM) having a second band of wavelengths with distinct carrier frequencies from 190200 GHz to 194100 GHz (40 wavelengths), the carrier frequency of the 41$^{st}$ wavelength of the band of frequencies (used by the tunable laser of 150/150b) would be either 190100 GHz or 194200 GHz (i.e., 100 GHz away from either side of the second band of wavelengths). For the example, because the ROADM 110 supports one wavelength greater than the number of wavelengths allowed to enter the ROADM via the common port 168, the ROADM is able to send a test signal out of an optical degree of the ROADM (via the 41$^{st}$ wavelength tuned to by the tunable laser within the optical transmitter 150/150b) even for the case of when all forty (40) wavelengths are entering the ROADM at the common port 168 from the optical multiplexer 191. The wavelengths within the second band of wavelengths can be referred to as user wavelengths, since these are the wavelength that are available to a user of the system (ROADM), while the wavelengths of the band of wavelengths (used by the optical transmitter 150/150b and optical receiver 180/180b) can be referred to as the system wavelengths. Since there are more system wavelengths than user wavelengths for the ROADM 110, the ROADM 110 is always capable of testing optical paths beginning and ending at the ROADM 110, even for the case where the user is using all of the user wavelengths of the system (ROADM).

Assume that the number of wavelengths in the second band of distinct carrier frequencies (i.e., the user wavelengths) is equal to m. Then in the optical node 100, the number of add ports of the optical multiplexer 191 could be equal to m (so that k=m), or the number of add ports of the optical multiplexer 191 could be less than m (so that k<m). The case where k=m may correspond to the case where the optical multiplexer (191 of FIG. 1A) comprises of colored optical ports, perhaps utilizing an arrayed waveguide grating (AWG), while the case where k<m may correspond to the case where the optical multiplexer (191 of FIG. 1A) comprises of colorless optical ports, perhaps using a simple k to 1 optical coupler.

Regardless if k=m, or k<m, the number of wavelengths r supported within the wavelength equalizers 120a-g and optical amplifiers 140a-f may be equal to m or greater than m (i.e., r=m or r>m). If r>m for all wavelength equalizers 120a-g and if r>m for all optical amplifiers 140a-f, and if the embedded optical transmitter 150 (or 150b) is able to be tuned to a number of wavelengths greater than m (while supporting all m wavelengths), then it is possible to generate a wavelength between two optical nodes by the embedded optical transmitter 150/150b even for the case where all m user wavelengths are being utilized.

The ROADM 110 is designed such that an optical signal (wavelength) added to the optical multiplexer 191 (via an add port) can be forwarded out the first optical degree 160, the second optical degree 161, or both optical degrees—making the add ports of the optical multiplexer 191 directionless. Similarly, the ROADM 110 is designed such that an optical signal from either the first optical degree 160 or the second optical degree can be forwarded to a drop port on the optical demultiplexer 192—making the drop ports of the optical demultiplexer 192 directionless.

The embedded optical transmitter 150 of the ROADM 110 of FIG. 1A is both colorless and directionless. The embedded optical transmitter 150 can be optically tuned to any of m number of wavelengths supported by the optical transmitters attached to the add ports of the optical multiplexer 191, and additionally may optionally be able to be tuned to wavelengths outside of the m number of wavelengths (e.g., wavelength number 0, −1, −2, −3, etc., or wavelength m+1, m+2, m+3, etc.). The ROADM 110 may support a minimum of one additional wavelength beyond the m number of maximum wavelengths supported by the optical transmitters attached to the add ports of the optical multiplexer 191 (or, at a minimum, r=m+1). In a typical implementation, the rth wavelength would either equal wavelength number 0 or wavelength number m+1, which would have the least impact on the requirements of the optical amplifiers 140a-f, (due to the close proximity to the other m wavelengths, as previously discussed).

Additionally, a wavelength generated by the embedded optical transmitter 150 can be forwarded out of the first optical degree 160, the second optical degree 161, or both the first optical degree and second optical degree simultaneously. And, a wavelength from either the first optical degree 160 or the second optical degree 161 can be forwarded to the embedded optical receiver 180.

The wavelength equalizers 120a-f control the flow of optical wavelengths through the ROADM 110. Wavelength equalizer 120a passes and blocks wavelengths from the first optical degree 160 to the common port 168 (connected to the optical demultiplexer 192). Wavelength equalizer 120b passes and blocks wavelengths from the second optical degree 161 to the first optical degree 160. Wavelength equalizer 120c passes and blocks wavelengths from the common port 168 (connected to the optical multiplexer 191) to the first optical degree 160. Wavelength equalizer 120d passes and block wavelengths from the second optical degree 161 to the common port 168 (connected to the optical demultiplexer 192). Wavelength equalizer 120e passes and blocks wavelengths from the first optical degree 160 to the second optical degree 161. Wavelength equalizer 120f passes and blocks wavelengths from the common port 168 (connected to the optical multiplexer 191) to the second optical degree 161. Wavelength equalizer 120g is used to pass (i.e., drop) a single selected wavelength to the embedded optical receiver 180.

The ROADM circuitry 110 may wholly be contained on a single circuit pack. The optical transmitter and optical receiver are considered to be "embedded" because they are wholly contained within the ROADM circuit pack (rather than residing on circuit packs separate from the ROADM circuit pack). The optical multiplexer 191 and optical demultiplexer 192 may be contained on a circuit pack separate from the circuit pack containing the ROADM circuitry 110, or they may be contained on the same circuit pack containing the ROADM circuitry 110.

Figure 1G:
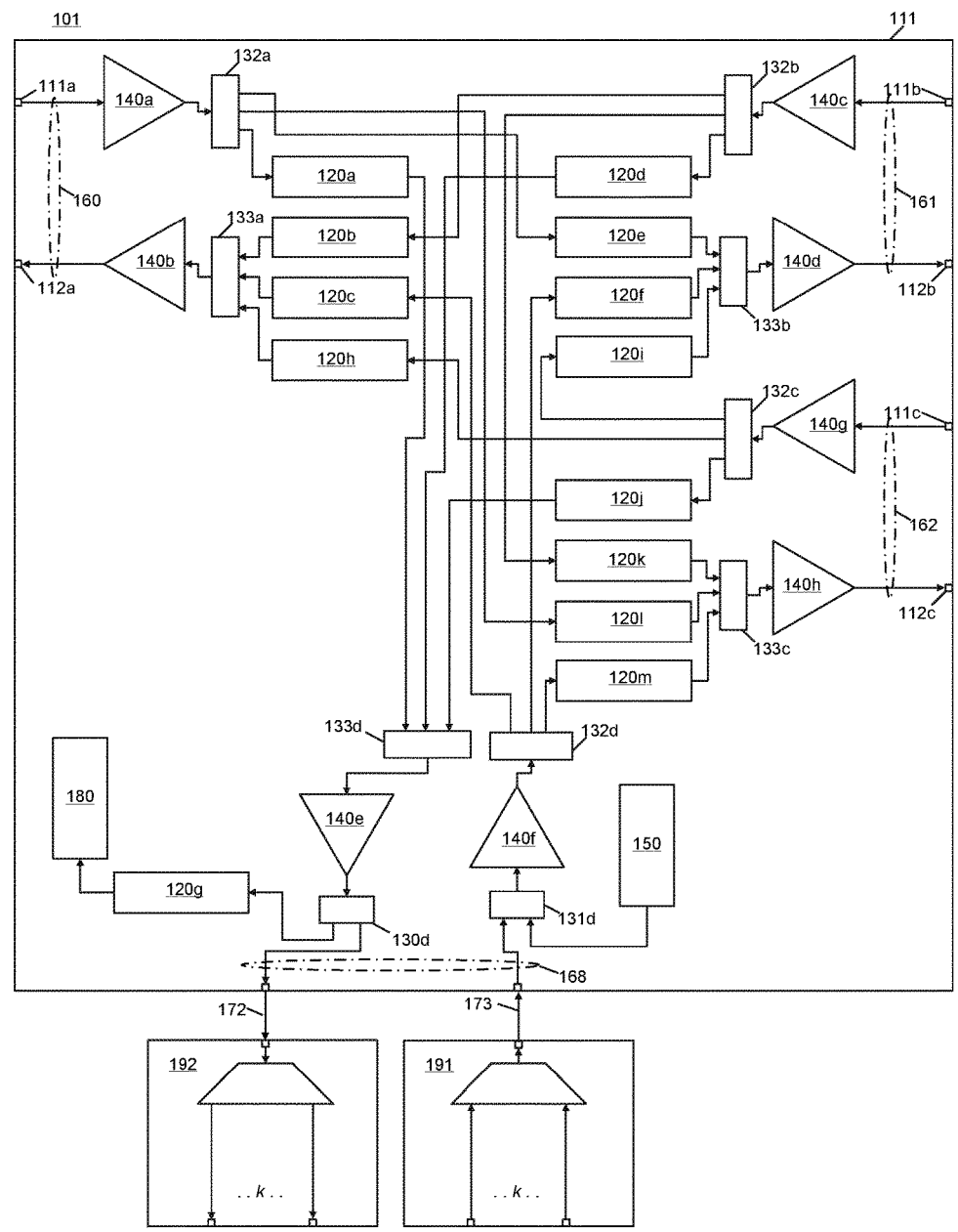
FIG. 1G is an illustration of a three degree optical node.

FIG. 1G shows an optical node 101 comprising a ROADM 111 having three optical degrees 160, 161, 162, an optical multiplexer 191, and an optical demultiplexer 192.

The optical multiplexer 191 of FIG. 1G comprises k number of optical add ports, an optical wavelength multiplexer connected to the k number of optical add ports, and an optical multiplexer common port connected to the optical wavelength multiplexer, wherein the optical multiplexer common port is connected to the ROADM common port 168 via optical fiber jumper cable 173.

The optical demultiplexer 192 of FIG. 1G comprises k number of optical drop ports, an optical wavelength demultiplexer connected to the k number of optical drop ports, and an optical demultiplexer common port connected to the optical wavelength demultiplexer, wherein the optical demultiplexer common port is connected to the ROADM common port 168 via optical fiber jumper cable 172.

The ROADM functionality 111 may be wholly placed on a circuit pack, creating a ROADM circuit back. The ROADM comprises three optical degrees 160-162, eight optional optical amplifiers 140a-h, thirteen wavelength equalizers 120a-m, four 1:3 optical couplers 132a-d, four 3:1 optical couplers 133a-d, one 1:2 optical coupler 130d, one 2:1 optical coupler 131d, an embedded optical transmitter 150, and an embedded optical receiver 180.

The first optical degree 160 of the ROADM 111 is used to optically interconnect to a second optical node, and comprises an input optical interface (optical port) 111a, and an output optical interface (optical port) 112a. The second optical degree 161 of the ROADM 111 is used to optically interconnect to a third optical node, and comprises an input optical interface (optical port) 111b, and an output optical interface (optical port) 112b. The third optical degree 162 of ROADM 111 is used to optically interconnect to a fourth optical node, and comprises an input optical interface (optical port) 111c, and an output optical interface (optical port) 112c. The ROADM has an optical common port 168, used to optically connect to the optical multiplexer 191 via optical fiber jumper cable 173, and used to optically connect to the optical demultiplexer 192 via optical fiber jumper cable 172.

The wavelength equalizers 120a-m of FIG. 1G can be the same as—for example—the wavelength equalizer 120 shown in FIG. 1B, although they are not limited thereto. The optical transmitter 150 of FIG. 1G can be the same as—for example—the optical transmitter 150 shown in FIG. 1C, although it is not limited thereto. The optical transmitter 150 of FIG. 1G can be the same as—for example—the optical transmitter 150b shown in FIG. 1E, although it is not limited thereto. The optical receiver 180 of FIG. 1G can be the same as—for example—the optical transmitter 180 shown in FIG. 1D, although it is not limited thereto. The optical receiver 180 of FIG. 1G can be the same as—for example—the optical transmitter 180b shown in FIG. 1F, although it is not limited thereto.

The wavelength equalizers 120a-m control the flow of optical wavelengths through the ROADM 111. Wavelength equalizer 120a passes and block wavelengths from the first optical degree 160 to the common port 168 (connected to the optical demultiplexer 192). Wavelength equalizer 120b passes and blocks wavelengths from the second optical degree 161 to the first degree 160. Wavelength equalizer 120c passes and blocks wavelengths from the common port 168 (connected to the optical multiplexer 191) to the first optical degree 160. Wavelength equalizer 120d passes and block wavelengths from the second optical degree 161 to the common port 168 (connected to the optical demultiplexer 192). Wavelength equalizer 120e passes and blocks wavelengths from the first optical degree 160 to the second optical degree 161. Wavelength equalizer 120f passes and blocks wavelengths from the common port 168 (connected to the optical multiplexer 191) to the second optical degree 161. Wavelength equalizer 120g is used to pass a single selected wavelength to the embedded optical receiver 180. Wavelength equalizer 120h passes and blocks wavelengths from the third optical degree 162 to the first optical degree 160. Wavelength equalizer 120i passes and blocks wavelengths from the third optical degree 162 to the second optical degree 161. Wavelength equalizer 120j passes and blocks wavelengths from the third optical degree 162 to the common port 168 (connected to the optical demultiplexer 192). Wavelength equalizer 120k passes and blocks wavelengths from the second optical degree 161 to the third optical degree 162. Wavelength equalizer 120l passes and blocks wavelengths from the first optical degree 160 to the third optical degree 162. Wavelength equalizer 120m passes and blocks wavelengths from the common port 168 (connected to the optical multiplexer 191) to the third optical degree 162.

Figure 2:
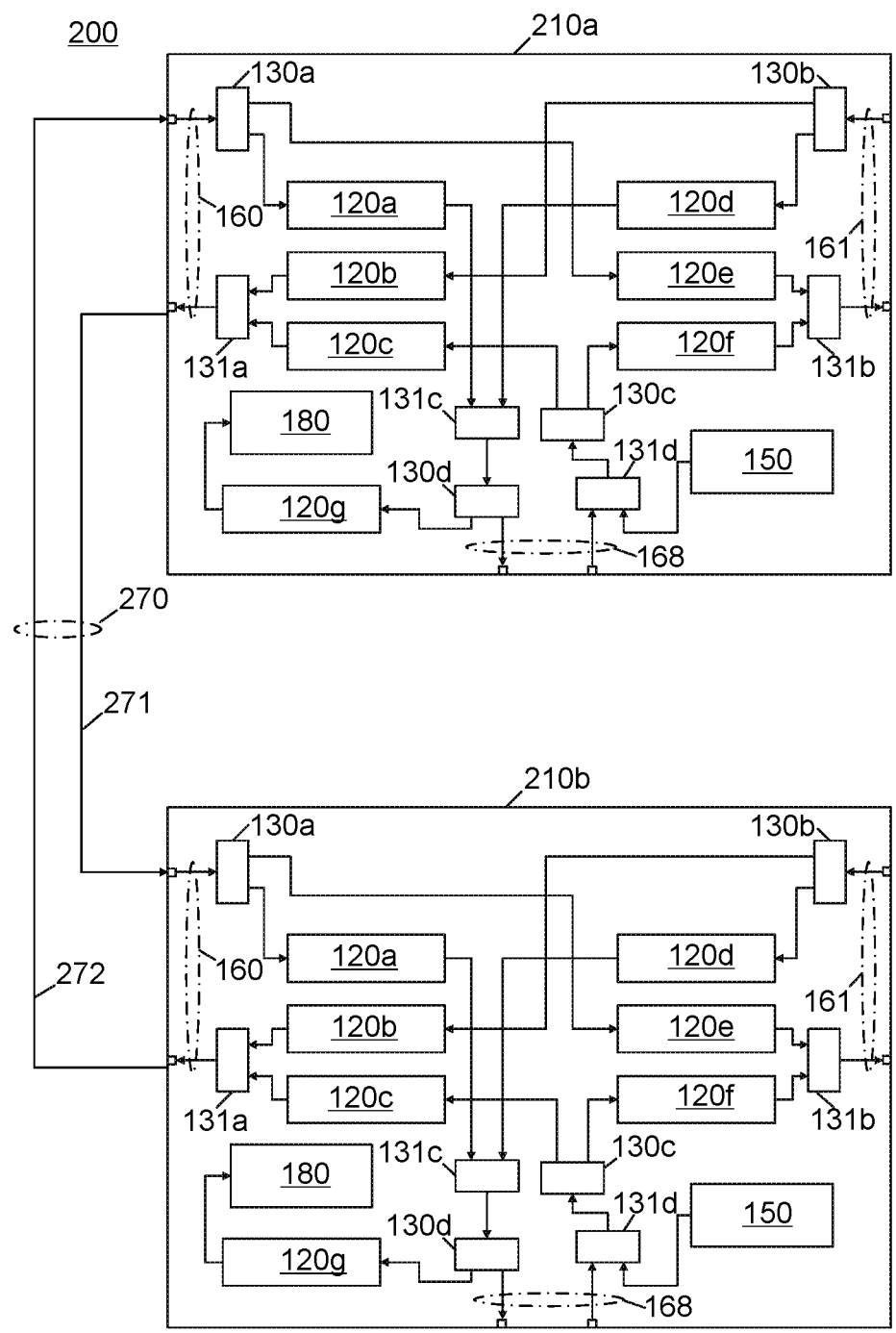
FIG. 2 is an illustration of an optical network with two interconnected nodes.

The ROADMs 110,111 can be used to test optical paths between optical nodes without the use of optical transmitters attached to the add ports of optical multiplexer 191, and without the use of optical receivers attached to the drop ports of the optical demultiplexer 192. FIG. 2 depicts an optical network 200 comprising of a first optical node with a first ROADM 210a, a second optical node with a second ROADM 210b, and a bidirectional optical path 270 between the two optical nodes. The bidirectional optical path 270 further comprises a first optical fiber 271 connecting the output of the first optical degree of the first optical node to the input of the first optical degree of the second optical node, and a second optical fiber 272 connecting the output of the first optical degree of the second optical node to the input of the first optical degree of the first optical node. The first optical node and the second optical node comprise ROADMS 210a-b with ROADM circuitry, similar to that of ROADM 110, except, for simplicity, optical amplifiers are not populated within the ROADMs 210a-b. All other optical circuitry of ROADMs 210a-b is identical to that of ROADM 110. Namely, optical nodes 210a-b comprise of a first optical degree 160, a second optical degree 161, a common port 168, seven wavelength equalizers 120a-g, four 1:2 optical couplers 130a-d, four 2:1 optical couplers 131a-d, an embedded optical transmitter 150, and an embedded optical receiver 180. The common ports 168 of the two ROADMs 210a-b are not used in the two optical nodes, but could be used by attaching an optical multiplexer 191 and an optical demultiplex 192 to the common port 168 of each ROADM 201a-b of the two optical nodes.

Within each ROADM 210a-b, the optical coupler 130a is used to broadcast all wavelengths received from the input of the first optical degree 160 to both wavelength equalizer 120a and wavelength equalizer 120e, the optical coupler 130b is used to broadcast all wavelengths received from the input of the second optical degree 161 to both wavelength equalizer 120b and wavelength equalizer 120d, the optical coupler 130c is used to broadcast all wavelengths received from the input of the common port 168 and the optical transmitter 150 to both wavelength equalizer 120c and wavelength equalizer 120f, and the optical coupler 130d is used to broadcast all wavelengths received from optical coupler 131c to both the common port 168 and wavelength equalizer 120g.

Within each ROADM 210a-b, the optical coupler 131a is used to combine wavelengths from wavelength equalizer 120b and wavelength equalizer 120c, the optical coupler 131b is used to combine wavelengths from wavelength equalizer 120e and wavelength equalizer 120f, the optical coupler 131c is used to combine wavelengths from wavelength equalizer 120a and wavelength equalizer 120d, and the optical coupler 131d is used to combine wavelengths from the common port 168 and the optical transmitter 150.

Within each ROADM 210a-b, wavelength equalizer 120a passes and blocks wavelengths from the first degree 160 to the common port 168 (and to the optical receiver 180 via wavelength equalizer 120g), wavelength equalizer 120b passes and blocks wavelengths from the second optical degree 161 to the first optical degree 160, wavelength equalizer 120c passes and blocks wavelengths from the common port 168 (and from the optical transmitter 150) to the first optical degree 160, wavelength equalizer 120d passes and block wavelengths from the second optical degree 161 to the common port 168 (and to the optical receiver 180 via wavelength equalizer 120g), wavelength equalizer 120e passes and blocks wavelengths from the first optical degree 160 to the second optical degree 161, wavelength equalizer 120f passes and blocks wavelengths from the common port 168 (and from the optical transmitter 150) to the second optical degree 161, and wavelength equalizer 120g is used to pass a single selected wavelength to the embedded optical receiver 180.

Although ROADMs 210a and 210b do not include optical amplifiers, the six optical amplifiers 140a-f of ROADM 110 (of FIG. 1A) could optionally be used within the ROADMs 210a-b.

The optical interfaces and optical circuitry 160, 161, 168, 120a-g, 130a-d, 131a-d,150 and 180 represent the required interfaces and optical circuitry of a two degree ROADM with a common port 168 supporting directionless add/drop ports. The optical interfaces and optical circuitry 160, 161, 168, 120a-g, 130a-d, 131a-d, 150 and 180 of each ROADM may be placed on a common circuit pack to create a first ROADM circuit pack 210a and a second ROADM circuit pack 210b.

Testing of the bidirectional optical path 270 in the direction from the first optical node 210a to the second optical node 210b is accomplished as follows. The output of the optical transmitter 150 embedded within the first ROADM 210a of the first node optical is tuned to a wavelength within a band of wavelengths. The band of wavelengths may be a band defined by the international Telecommunication Union (ITU) such as the C-band or L-band (discussed in ITU document ITU-T G.694.1), or a subset of such bands. The first ROADM 210a may be wholly contained on a first circuit pack. The optical transmitter 150 then generates a test signal used to modulate the carrier frequency of the wavelength tuned to by the optical transmitter 150. In other words, the optical transmitter 150 generates a test signal over the wavelength. The ROADM 210a of the first node is then configured (using software in the preferred embodiment) to forward the wavelength from the optical transmitter 150 of the first ROADM 210a out of the first optical degree 160 of the first ROADM 210a onto the optical fiber 271 of the bidirectional optical path 270. Configuring the first ROADM 210a may be accomplished using software to configure one or more wavelength equalizers 120a-g within the first ROADM 210a. More specifically, wavelength equalizer 120c of the first ROADM 210a may be configured to pass the wavelength from the optical transmitter 150 to the output of the first optical degree 160 of ROADM 210a. On ROADM 210a, the optical path of the wavelength from the optical transmitter 150 includes the optical coupler 131d, the optical coupler 130c, the wavelength equalizer 120c, and the optical coupler 131a. The optical coupler 131d of the first ROADM 210a combines the wavelength from the optical transmitter 150 of the first ROADM 210a with any wavelengths from the common port 168 of the first ROADM 210a. The optical coupler 130c of the first ROADM 210a broadcasts the wavelengths from optical coupler 131d of the first ROADM 210a to both wavelength equalizer 120c and 120f of the first ROADM 210a. The optical coupler 131a of the first ROADM 210a combines the wavelength from the optical transmitter 150 of the first ROADM 210a (along with any other wavelengths exiting wavelength equalizer 120c of the first ROADM 210a) with any wavelengths exiting wavelength equalizer 120b on ROADM 210a.All wavelengths exiting coupler 131a on ROADM 210a are then forwarded to optical fiber 271 of the bidirectional optical path 270 between the first optical node and the second optical node.

At the second optical node, the second ROADM 210b receives the wavelength with the test signal from the bidirectional optical path 270. The interfaces and circuitry of the second ROADM 210b may be wholly contained on a second circuit pack. The second ROADM 210b is configured (using software in the preferred embodiment) to forward the wavelength with the test signal to an optical receiver 180 embedded within the second ROADM. This is accomplished by first enabling the wavelength with the test signal to pass through wavelength equalizer 120a of ROADM 210b, by using software to configure wavelength equalizer 120a of ROADM 210b. The wavelength is then passed to wavelength equalizer 120g of ROADM 210b via optical couplers 131c and 130d. Wavelength equalizer 120g of ROADM 210b is then configured by software to pass only the wavelength having the test signal to the optical receiver 180 of ROADM 210b. At optical receiver 180 of ROADM 210b, the test signal is checked for bit errors by the pattern checker 186 within the electronics of the optical receiver 180 of ROADM 210b, and the performance of the test signal is recorded at the second ROADM 210b.

In general, when the optical circuitry of ROADM 210a is included on a first ROADM circuit pack of a first node, and when the optical circuitry of ROADM 210b is included on a second ROADM circuit pack of a second node, a method of testing an optical path between network nodes comprises, tuning the output of an optical transmitter 150 embedded within a first reconfigurable optical add-drop multiplexer circuit pack 210a of a first optical node to a wavelength within a band of wavelengths, generating a test signal over the wavelength, configuring the first reconfigurable optical add-drop multiplexer circuit pack 210a to forward the wavelength out of a first optical degree 160 onto an optical path 270, receiving the wavelength with the test signal from the optical path 270 at a second optical degree of a second reconfigurable optical add-drop multiplexer circuit pack 210b of a second optical node, configuring the second reconfigurable optical add-drop multiplexer circuit pack 210b to forward the wavelength with the test signal to an optical receiver 180 embedded within the second reconfigurable optical add-drop multiplexer circuit pack 210b, and recording a performance of the test signal at the second reconfigurable optical add-drop multiplexer circuit pack 210b.

The bidirectional optical path 270 between the two optical nodes of 200 comprises of two unidirectional optical paths: one unidirectional optical path (or simply optical path) from the first node to the second node that comprises of optical fiber 271, and one unidirectional optical path (or simply optical path) from the second node to the first node that comprises of optical fiber 272.

Figure 3:
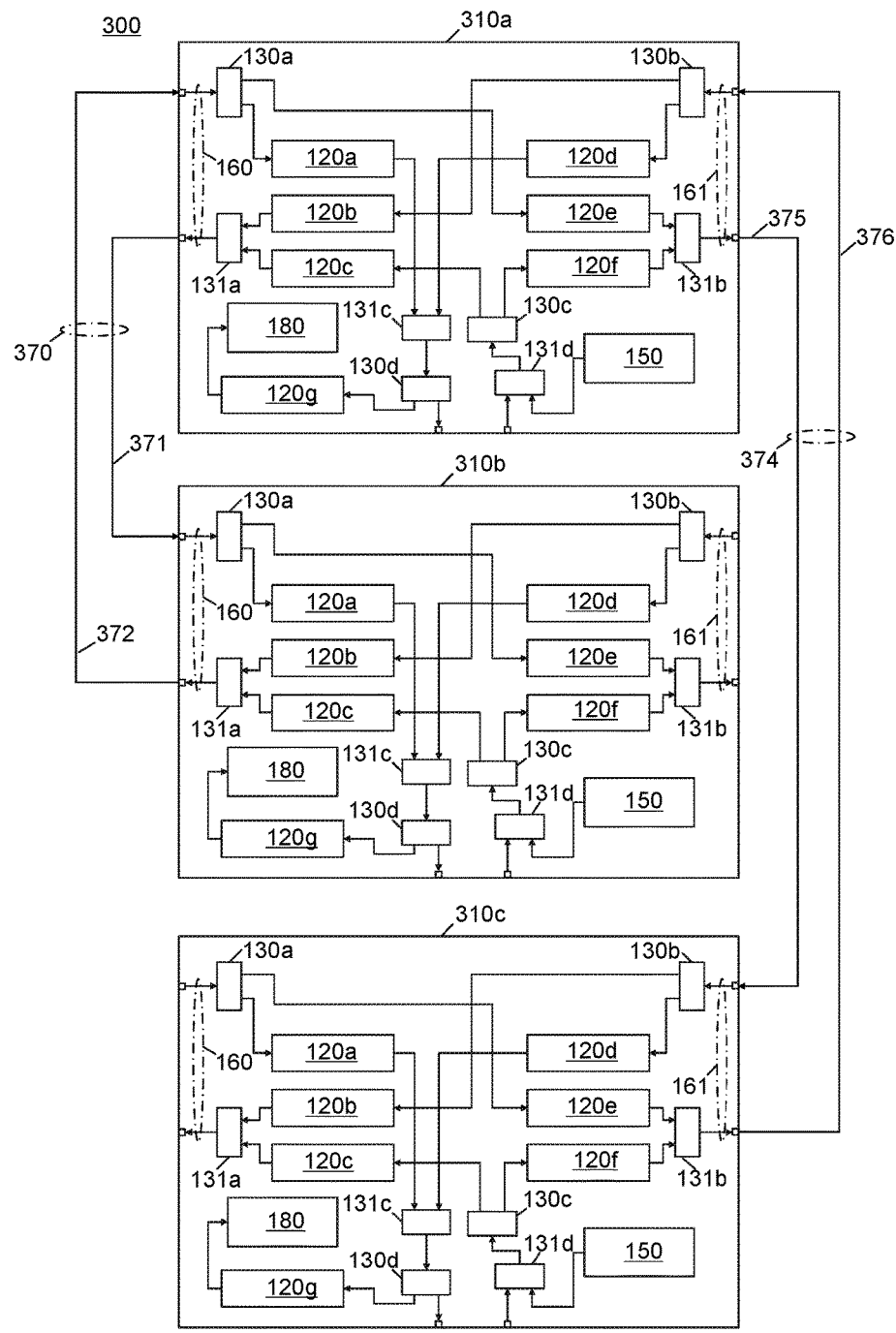
FIG. 3 is an illustration of an optical network with three interconnected nodes.

FIG. 3 illustrates an optical network 300 comprising a first reconfigurable optical add drop multiplexer (ROADM) 310a within a first optical node, a second reconfigurable optical add drop multiplexer (ROADM) 310b within a second optical node, a third reconfigurable optical add drop multiplexer (ROADM) 310c within a third optical node, a first bidirectional optical path 370 connecting the first reconfigurable optical add drop multiplexer 310a within the first optical node to the second reconfigurable optical add drop multiplexer 310b within the second optical node, and a second bidirectional optical path 374 connecting the first reconfigurable optical add drop multiplexer 310a within the first optical node to the third reconfigurable optical add drop multiplexer 310c within the third optical node.

The reconfigurable optical add drop multiplexers 310a-c of FIG. 3 can be the same as—for example—reconfigurable optical add drop multiplexer 210a shown in FIG. 2, although they are not limited thereto.

The bidirectional optical path 370 between the two optical nodes containing ROADMs 310a and 310b comprises of two unidirectional optical paths: one unidirectional optical path (or simply optical path) from the first node to the second node that comprises of optical fiber 371, and one unidirectional optical path (or simply optical path) from the second node to the first node that comprises of optical fiber 372. The bidirectional optical path 374 between the two optical nodes containing ROADMs 310a and 310c comprises of two unidirectional optical paths: one unidirectional optical path (or simply optical path) from the first node to the third node that comprises of optical fiber 375 and one unidirectional optical path (or simply optical path) from the third node to the first node that comprises of optical fiber 376.

The unidirectional optical paths originating from the first optical node can be tested by configuring the optical circuitry within ROADMs 310a (of the first optical node), 310b (of the second optical node), and 310c (of the third optical node). The method proceeds as follows. The output of the optical transmitter 150 embedded within the first ROADM 310a of the first optical node is tuned to a wavelength within a band of wavelengths. The band of wavelengths may be a band defined by the ITU such as the C-band or L-band, or some subset thereof. The first ROADM 310a may be wholly contained on a first circuit pack. The optical transmitter 150 of the first ROADM 310a generates a test signal used to modulate the wavelength tuned to by the optical transmitter 150 of the first ROADM 310a. In other words, the optical transmitter generates a test signal over the wavelength. The ROADM 310a of the first node is then configured to forward the wavelength from the optical transmitter 150 of the first ROADM 310a out of the first optical degree 160 of the first ROADM 310a onto the optical fiber 371 of the bidirectional optical path 370. Configuring the ROADM 310a may be accomplished using software to configure one or more wavelength equalizers within the first ROADM 310a. More specifically, wavelength equalizer 120c within the first ROADM 310a may be configured to pass the wavelength from the optical transmitter 150 of the first ROADM 310a to the output of the first optical degree 160 of the first ROADM 310a. The optical path of the wavelength from the optical transmitter 150 of the first ROADM 310a includes the optical coupler 131d, the optical coupler 130c, the wavelength equalizer 120c, and the optical coupler 131a, all within ROADM 310a. The optical coupler 131d of the first ROADM 310a combines the wavelength from the optical transmitter 150 of the first ROADM 310a with any wavelengths from the common port 168 of the first ROADM 310a. The optical coupler 130c of the first ROADM 310a broadcasts the wavelengths from optical coupler 131d of the first ROADM 310a to both wavelength equalizer 120c and 120f of the first ROADM 310a. The optical coupler 131a of the first ROADM 310a combines the wavelength from the optical transmitter 150 of the first ROADM 310a (along with any other wavelengths exiting wavelength equalizer 120c of the first ROADM 310a) with any wavelengths exiting wavelength equalizer 120b of the first ROADM 310a. All wavelengths exiting coupler 131a of the first ROADM 310a (including the wavelength with the test signal) are then forwarded to optical fiber 371 of the bidirectional optical path 370 between the first optical node and the second optical node. At the second optical node, the second ROADM 310b receives the wavelength with the test signal from the optical fiber 371 of the bidirectional optical path 370. The ROADM 310b may be wholly contained on a second circuit pack. The second ROADM 310b is configured (using software in the preferred embodiment) to forward the wavelength with the test signal to an optical receiver 180 embedded within the second ROADM 310b. This is accomplished by first enabling the wavelength with the test signal to pass through wavelength equalizer 120a of the second ROADM 310b. The wavelength is then passed to wavelength equalizer 120g of the second ROADM 310b via optical couplers 131c and 130d of the second ROADM 310b. Wavelength equalizer 120g of the second ROADM 310b is then configured by software to pass only the wavelength having the test signal to the optical receiver 180 of the second ROADM 310b. At optical receiver 180 of the second ROADM 310b, the test signal is checked for bit errors by the pattern checker 186 within the electronics of the optical receiver 180 of the second ROADM 310b, and the performance of the test signal is recorded at the second ROADM 310b.

Following the completion of testing the bidirectional optical path 370 from the first optical node to the second optical node, the bidirectional optical path 374 from the first optical node to the third optical node is tested. The method proceeds as follows. The output of the optical transmitter 150 embedded within the first ROADM 310a of the first optical node is tuned to a second wavelength within a band of wavelengths, wherein the second wavelength may be the same as the first wavelength (i.e., the carrier frequency of the second wavelength may be the same as (equal to) the carrier frequency of first wavelength). The band of wavelengths may be a band defined by the ITU such as the C-band or L-band, or some subset thereof. The optical transmitter 150 of the first ROADM 310a generates a second test signal used to modulate the second wavelength tuned to by the optical transmitter 150 of the first ROADM 310a. In other words, the optical transmitter 150 of the first ROADM 310a generates a second test signal over the second wavelength. The first ROADM 310a of the first node is then configured to forward the second wavelength from the optical transmitter 150 of the first ROADM 310a out of the second optical degree 161 of the first ROADM 310a onto the optical fiber 375 of the bidirectional optical path 374. Configuring the first ROADM 310a may be accomplished using software to configure one or more wavelength equalizers within the first ROADM 310a. More specifically, wavelength equalizer 120f within the first ROADM 310a may be configured to pass the second wavelength from the optical transmitter 150 of the first ROADM 310a to the output of the second optical degree 161 of ROADM 310a. The path of the second wavelength from the optical transmitter 150 of ROADM 310a includes the optical coupler 131d, the optical coupler 130c, the wavelength equalizer 120f, and the optical coupler 131b, all within ROADM 310a. The optical coupler 131d of ROADM 310a combines the second wavelength from the optical transmitter 150 of ROADM 310a with any wavelengths from the common port 168 on ROADM 310a. The optical coupler 130c of ROADM 310a broadcasts the wavelengths from optical coupler 131d of ROADM 310a to both wavelength equalizer 120c and 120f on ROADM 310a. The optical coupler 131b of ROADM 310a combines the second wavelength from the optical transmitter 150 of ROADM 310a (along with any other wavelengths exiting wavelength equalizer 120f of ROADM 310a) with any wavelengths exiting wavelength equalizer 120e of ROADM 310a. All wavelengths exiting coupler 131b of ROADM 310a (including the second wavelength) are then forwarded to optical fiber 375 of the bidirectional optical path 374 between the first optical node and the third optical node. At the third optical node, the third ROADM 310c receives the second wavelength with the second test signal from the bidirectional optical path 374. The third ROADM 310c may be wholly contained on a third circuit pack. The third ROADM 310c is configured (using software in the preferred embodiment) to forward the second wavelength with the second test signal to an optical receiver 180 embedded within the third ROADM 310c. This is accomplished by first enabling the second wavelength with the second test signal to pass through wavelength equalizer 120d of the third ROADM 310c. The second wavelength is then passed to wavelength equalizer 120g of the third ROADM 310c via optical couplers 131c and 130d of the third ROADM 310c. Wavelength equalizer 120g of the third ROADM 310c is then configured by software to pass only the second wavelength having the second test signal to the optical receiver 180 of the third ROADM 310c. At optical receiver 180 of the third ROADM 310c, the second test signal is checked for bit errors by the pattern checker 186 within the electronics of the optical receiver 180 of the third ROADM 310c, and the performance of the second test signal is recorded at the third ROADM 310c.

In general, a method of testing optical paths 370, 374 originating at an optical node, comprises, tuning the output of an optical transmitter 150 embedded within a first reconfigurable optical add-drop multiplexer circuit pack 310a of a first optical node to a wavelength within a band of wavelengths, generating a test signal over the wavelength, configuring the first reconfigurable optical add-drop multiplexer circuit pack 310a to forward the wavelength out of a first optical degree 160 onto an optical path 370, receiving the wavelength with the test signal from the optical path 370 at a second reconfigurable optical add-drop multiplexer circuit pack 310b of a second optical node, configuring the second reconfigurable optical add-drop multiplexer circuit pack 310b to forward the wavelength with the test signal to an optical receiver 180 embedded within the second reconfigurable optical add-drop multiplexer circuit pack 310b, and recording a performance of the test signal at the second reconfigurable optical add-drop multiplexer circuit pack 310b. The method further comprises, tuning the output of the optical transmitter 150 to a second wavelength within the band of wavelengths, generating a second test signal over the second wavelength, configuring the first reconfigurable optical add-drop multiplexer circuit pack 310a to forward the second wavelength out of a second optical degree 161 onto a second optical path 374, receiving the second wavelength with the second test signal from the second optical path 374 at a third reconfigurable optical add-drop multiplexer circuit pack 310c of a third optical node, configuring the third reconfigurable optical add-drop multiplexer circuit pack 310c to forward the second wavelength with the second test signal to a second optical receiver 180 embedded within the third reconfigurable optical add-drop multiplexer circuit pack 310c, and recording a second performance of the second test signal at the third reconfigurable optical add-drop multiplexer circuit pack 310c.

An optical path from a first optical node to a second optical node may need to go through a third optical node. Such an optical path is depicted in the optical network 400 shown in FIG. 4. The optical network 400 comprises, a first optical node with a first ROADM 410a, a second optical node with a second ROADM 410b, a third optical node with a third ROADM 410c, a first optical fiber 471 originating at the first optical node and terminating at the second optical node, a second optical fiber 472 originating at the second optical node and terminating at the first optical node, a third optical fiber 476 originating at the second optical node and terminating at the third optical node, and a fourth optical fiber 475 originating at the third optical node and terminating at the second optical node. The first optical fiber 471 constitutes an optical path from the first optical node to the second optical node. The second optical fiber 472 constitutes an optical path from the second optical node to the first optical node. The third optical fiber 476 constitutes an optical path from the second optical node to the third optical node. The fourth optical fiber 475 constitutes an optical path from the third optical node to the second optical node. The bidirectional optical path 470 between the first optical node and the second optical node comprises of optical fibers 471 and 472. The bidirectional optical path 474 between the second optical node and the third optical node comprises of optical fibers 475 and 476. The optical path from the first optical node to the third optical node includes optical fiber 471 (between the first optical and second optical node) and optical fiber 476 (between the second optical node and the third optical node). The path from the first optical node to the third optical node also includes the ROADM 410*b*, which is used to connect the two optical fibers making up the optical path from the first optical node to the third optical node. In the present invention, each of the optical fibers that comprise an optical path from a first optical node to a second optical node is referred to as optical span. Therefore, within optical network 400, the optical path from the first ROADM 410*a* of the first optical node to the third ROADM 410*c* of the third optical node comprises of an optical span from the first optical node to the second optical node (comprising of optical fiber 471), and an optical span from the second optical node to the third optical node (comprising of optical fiber 476). Similarly, within optical network 400, the optical path from the third ROADM 410*c* of the third optical node to the first ROADM 410*a* of the first optical node comprises of an optical span from the third optical node to the second optical node (comprising of optical fiber 475), and an optical span from the second optical node to the first optical node (comprising of optical fiber 472). Since the first optical node is directly connected to the second optical node within the network 400, the optical path from the first ROADM 410*a* of the first optical node to the second ROADM 410*b* of the second optical node comprises of a single optical span (comprising of optical fiber 471), and the optical path from the second ROADM 410*b* of the second optical node to the first ROADM 410*a* of the first optical node comprises of a single optical span (comprising of optical fiber 472). Similarly, since the second optical node is directly connected to the third optical node within the network 400, the optical path from the second ROADM 410*b* of the second optical node to the third ROADM 410*c* of the third optical node comprises of a single optical span (comprising of optical fiber 476), and the optical path from the third ROADM 410*c* of the third optical node to the second ROADM 410*b* of the second optical node comprises of a single optical span (comprising of optical fiber 475).

Figure 4:
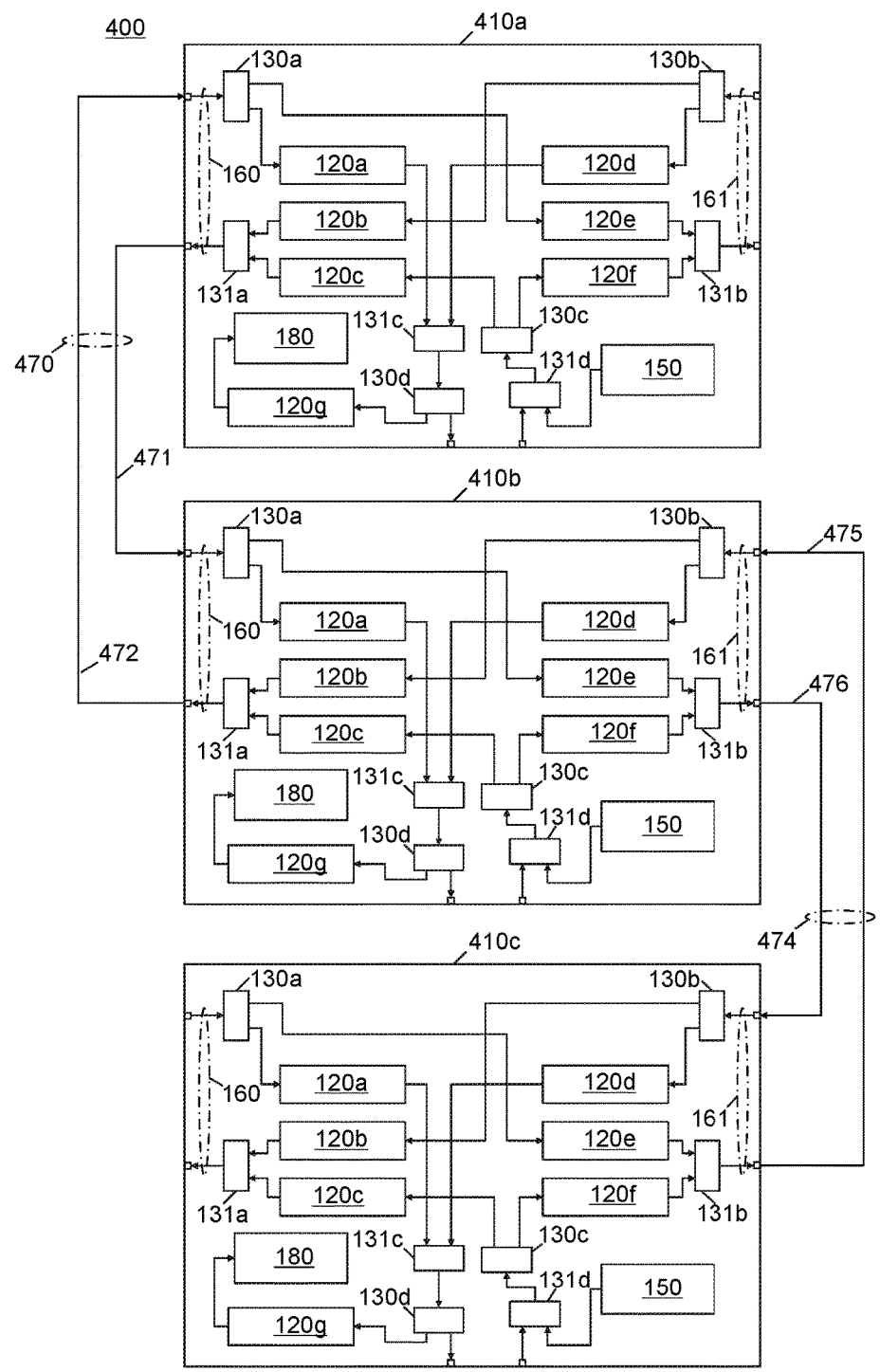
FIG. 4 is an illustration of an optical network with three interconnected nodes.

The reconfigurable optical add drop multiplexers (ROADMs) 410*a-c* of FIG. 4 can be the same as—for example—Reconfigurable optical add drop multiplexer 210*a* shown in FIG. 2, although they are not limited thereto. And the reconfigurable optical add drop multiplexers 410*a-c* of FIG. 4 can be the same as—for example—reconfigurable optical add drop multiplexer 310*a* shown in FIG. 3, although they are not limited thereto.

The circuitry comprising the first ROADM 410*a* (namely, 120*a-g*, 130*a-d*,1 31*a-d*, 150, and 180) may be wholly contained within a first circuit pack. The circuitry comprising the second ROADM 410*b* (namely, 120*a-g*, 130*a-d*, 131*a-d*, 150, and 180) may be wholly contained within a second circuit pack. The circuitry comprising the third ROADM 410*c* (namely, 120*a-g*, 130*a-d*, 131*a-d*, 150, and 180) may be wholly contained within a third circuit pack.

An optical span between a first optical node and a second optical node may be called problematic, if transmission over the optical span is in some way degraded. For instance, if the optical span between a first optical node and a second optical node has some fiber impairments that cause bit errors to be detected at the second optical node when transmitting from the first optical node to the second optical node, then this optical span may be declared to be problematic (as it causes problems for the transmission of a data stream between two optical nodes). A problematic optical span between a first optical node and a second optical node may be identified by testing the optical span using test circuitry embedded within the first optical node and the second optical node. Therefore, in order to test the optical span comprising of optical fiber 471, an optical signal with a test signal containing a predefined bit pattern may be sent from the optical transmitter 150 of the first ROADM 410*a* of the first optical node to the optical receiver 180 of the second ROADM 410*b* of the second optical node. At the optical receiver 180 of the second ROADM 410*b* of the second optical node bit errors may be detected by the optical receiver. If the number of bit errors detected at the optical receiver 180 of the second ROADM 410*b* exceeds some predefined threshold, the optical span 471 may be declared to be a problematic optical span—meaning the span may corrupt a signal passing over the optical span. A variety of conditions may cause a specific optical span to be problematic including (but not limited to): fiber length, fiber type, fiber impairments (e.g., chromatic dispersion (CD), polarization mode dispersion (PMD), etc.), excessive fiber loss (due to improper bend radius's or bad fiber splices), poor or faulty optical amplifiers, dirty optical connectors within the equipment at either end of the optical fiber span, non-linear effects, and others. A given single optical span between a first optical node and a second optical node may seem to be satisfactory based upon testing the given optical span using a test signal from the first optical node to the second optical node, and then checking for bit errors at the second optical node, but the given optical span may be borderline problematic, and therefore, when testing the optical span, one may wish to stress the test signal. Stressing the test signal can be done using a multitude of techniques, including: attenuating the optical power level of the optical wavelength carrying the test signal prior to transmitting the wavelength from a first optical node, attenuating the optical power level of the optical wavelength carrying the test signal at a second optical node after receiving the wavelength from a first optical node, lowering the optical signal to noise ratio (OSNR) of the optical wavelength carrying the test signal by modifying the optical gain of an optical amplifier (140*a-f* of FIG. 1A) within a first optical node and/or a second optical node, not using forward error correction at the second optical node to correct for bit errors, using only a minimal forward error correction to correct for bit errors, or testing the given single optical span with other optical spans. In general, any method of stressing the test signal (after the test signal leaves an optical transmitter 150 but before it reaches an optical receiver 180) may induce additional bit errors at an optical receiver.

The optical network 400 of FIG. 4 may be used to illustrate how a test signal can be stressed over an optical span between a first optical node and a second optical node by attenuating the optical power level of the optical wavelength carrying the test signal after receiving the test signal at the second optical node. As the optical power level of the optical wavelength carrying the test signal is lowered by increasing amounts, the test signal recovered from the broadband receiver 182 (within the optical receiver 180, 180*b*) will become increasingly susceptible to bit errors. Therefore, when testing the optical span 471 from the first ROADM 410*a* of the first optical node to the second ROADM 410*b* of the second optical node, the optical power level of the optical wavelength carrying the test signal can be attenuated by the wavelength equalizer 120*a* within the second ROADM 410*b* or by the wavelength equalizer 120*g* within the second ROADM 410*b*, via software control. Increasing the attenuation by greater amounts places greater stress on the test signal. In summary, when transmitting a test signal from a first optical node to a second optical node, attenuating the optical power level of the wavelength carrying the test signal using the ROADM within the second optical node is a method of stressing the test signal.

The optical network 400 of FIG. 4 may be used to illustrate how a test signal can be stressed over an optical span between a first optical node and a second optical node by turning off all forward error correction. Normally, some amount of forward error correction is utilized when transmitting an optical wavelength from a first optical node to a second optical node over an optical path that may include one or more intermediate optical nodes. For this case, optical transmitters 150*b* having forward error correction encoders are used, and optical receivers 180*b* having forward error correction decoders are used. Testing an optical span between a first optical node and a second optical node using forward error correction may mask all bit errors detected at the receiver. Therefore, turning off all forward error correction for transmission over the optical span may result in a measurable amount of bit errors, thereby providing an indication as to how problematic the optical span may be when used for transmission. Alternatively, instead of turning off all forward error correction, one may perform testing using a lower level of forward error correction (e.g., the first level of forward error correction (minimal forward error correction) rather than the second level of forward error correction (maximum forward error correction), as previously discussed). Some forward error correction decoders provide counts of corrected and uncorrected bit errors. These counts may be used instead of (or in addition to) the bit error counts detected at the pattern checker 186 to judge how problematic an optical span may be. In summary, operating an optical path absent of forward error correction, or operating an optical path with minimal forward error correction, are two methods of stressing a test signal between two optical nodes.

Different bit error rate thresholds may be used at the optical receiver depending upon whether forward error correction is utilized or not, and depending upon what type of forward error correction is utilized. For instance, the test signal at the optical receiver may have a first bit error rate associated with it if the bit error rate of the test signal is measured prior to forward error correction, and the test signal may have a second bit error rate associated with it if the bit error rate of the test signal is measured following minimal forward error correction, and the test signal may have a third bit error rate associated with it if the bit error rate of the test signal is measured following maximum forward error correction. There may be a bit error rate threshold associated with the first bit error rate, the second bit error rate, and the third bit error rate, wherein the first bit error rate threshold is based upon the bit error rate determined prior to forward error correction, and the second bit error rate threshold is based upon the bit error rate determined following minimal forward error correction, and the third bit error rate threshold is based upon the bit error rate determined following maximum forward error correction. In summary, testing identified optical spans or optical paths between network nodes may comprise of generating a signal along the optical spans or optical paths, and identifying those optical spans or optical paths that exceed a bit error rate threshold as degraded optical spans or degraded optical paths, wherein the bit error rate threshold may be based upon a first bit error rate determined prior to forward error correction, a second bit error rate determined following minimal forward error correction, or a third bit error rate determined following maximum forward error correction.

Excessive chromatic dispersion (CD) is an optical fiber impairment which can result in a degraded signal at an optical receiver 180. The optical receiver may contain electronics used to compensate for excessive chromatic dispersion (electronic dispersion compensation), thereby limiting the effect of chromatic dispersion on an optical signal at an optical receiver 180. For an optical receiver 180 containing electronics to compensate for chromatic dispersion, disabling the chromatic dispersion compensation at the optical receiver (thus preventing chromatic dispersion compensation), is another method of stressing a test signal between two optical nodes.

Excessive polarization mode dispersion (PMD) is an optical fiber impairment which can result in a degraded signal at an optical receiver 180. The optical receiver may contain electronics used to compensate for excessive polarization mode dispersion (electronic dispersion compensation), thereby limiting the effect of polarization mode dispersion on an optical signal at an optical receiver 180. For an optical receiver 180 containing electronics to compensate for polarization mode dispersion, disabling the polarization mode dispersion compensation at the optical receiver (thus preventing polarization mode dispersion compensation), is another method of stressing a test signal between two optical nodes.

The optical network 400 of FIG. 4 may be used to illustrate how a test signal can be stressed over an optical span by testing the optical span with other optical spans. When testing the optical span 471 of optical network 400, the test signal used to test the optical span 471 can be stressed by adding one or more additional optical spans in series with the optical span under test. The additional optical spans stress the optical wavelength carrying the test signal by adding more signal loss, adding more chromatic dispersion (CD), adding more polarization mode dispersion (PMD), and adding more optical noise (caused by the optical amplifiers typically used within each optical node). Accordingly, in order to stress the test signal over the optical span comprising optical fiber 471, the optical span comprising optical fiber 476 may be added to (i.e., concatenated with) the optical span comprising optical fiber 471 in optical network 400. For this case then, a wavelength carrying a test signal originates from optical transmitter 150 of the first ROADM 410*a* of the first optical node, and is routed out of the first optical degree 160 of the first ROADM 410*a* of the first optical node by configuring wavelength equalizer 120*c* of the first ROADM 410*a* to pass the wavelength carrying the test signal. When the wavelength carrying the test signal is received at the first optical degree 160 of the second ROADM 410*b* of the second optical node, the second ROADM 410*b* is configured to pass the wavelength carrying the test signal to the second optical degree 161 of the second ROADM 410*b*. This is done by configuring the wavelength equalizer 120*e* of the second ROADM 410*b* to pass the wavelength carrying the test signal to the second optical degree 161 of the second ROADM 410*b*. The wavelength carrying the test signal traverses the optical span comprising of optical fiber 476 and is received at the second degree 161 of the third ROADM 410*c* of the third optical node. The third ROADM 410*c* is configured to pass the wavelength carrying the test signal to the optical receiver 180 of the third ROADM 410*c*. This is done by configuring the wavelength equalizer 120*d* of the third ROADM 410*c* to pass the wavelength carrying the test signal to the wavelength equalizer 120*g* of the third ROADM 410*c*, and by configuring the wavelength equalizer 120*g* of the third ROADM 410*c* to pass the wavelength carrying the test signal to the optical receiver 180 of the third ROADM 410*c*, where the test signal is checked for bit errors. In order to stress the test signal by additional amounts, additional number of spans may be included with the optical span under test. It can be noted that by configuring wavelength equalizer 120*a* on ROADM 410*b* to pass the wavelength carrying the test signal to wavelength equalizer 120*g* on ROADM 410*b*, and by configuring wavelength equalizer 120*g* on ROADM 410*b* to pass only the wavelength carrying the test signal to optical receiver 180 on ROADM 410*b*, while simultaneously configuring wavelength equalizer 120*d* on ROADM 410*c* to pass the wavelength carrying the test signal to wavelength equalizer 120*g* on ROADM 410*c*, and by configuring wavelength equalizer 120*g* on ROADM 410*c* to pass only the wavelength carrying the test signal to optical receiver 180 on ROADM 410*c*, the test signal may be simultaneously tested at both the final node of the optical path, and on all intermediate nodes of the optical path.

In general, for an optical network wherein the reconfigurable optical add-drop multiplexer circuitry of an optical node is contained on a circuit pack, a method of identifying a problematic optical span between two optical nodes, comprises, tuning the output of an optical transmitter embedded within a first reconfigurable optical add-drop multiplexer circuit pack of a first optical node to a wavelength within a band of wavelengths, generating a test signal over the wavelength, configuring the first reconfigurable optical add-drop multiplexer circuit pack to forward the wavelength out of a first optical degree onto an optical span, stressing the test signal, receiving the wavelength with the test signal after the optical span at a second reconfigurable optical add-drop multiplexer circuit pack of a second optical node, configuring the second reconfigurable optical add-drop multiplexer circuit pack to forward the wavelength with the test signal to an optical receiver embedded within the second reconfigurable optical add-drop multiplexer circuit pack, recording a performance of the test signal at the second reconfigurable optical add-drop multiplexer circuit pack, and comparing the recorded performance of the test signal to a measure of performance. The method used to stress the test signal may comprise of testing the optical span with other optical spans, attenuating an optical power level of the wavelength carrying the test signal using the second reconfigurable optical add-drop multiplexer circuit pack, and/or operating in the absent of forward error correction or operating with minimal forward error correction.

Testing many optical paths within an optical network, wherein the many optical paths comprise of common optical spans, is a method of locating problematic optical spans within the optical network. In the present invention, various methods for locating problematic optical spans within an optical network are presented. At the highest level, a method of identifying problematic optical spans comprises: identifying optical paths between network nodes to test, testing identified optical paths between network nodes, identifying degraded optical paths between network nodes based upon testing, and comparing occurrences of each optical span within the degraded optical paths between network nodes. Alternatively, a method of identifying problematic optical spans comprises identifying optical paths between network nodes to test, testing identified optical paths between network nodes, identifying nondegraded optical paths between network nodes based upon testing, and comparing occurrences of each optical span within the nondegraded optical paths between network nodes.

Within a network of optical nodes, there may be multiple paths available between two nodes of the network. In one method of identifying problematic optical spans, all the optical paths between all the optical nodes may be identified. In other methods of identifying problematic optical spans, only a subset of optical paths may be identified. In general, identifying more optical paths through the network will generally provide better results in identifying problematic optical spans.

Each optical path through an optical network may comprise of a plurality of optical spans. For the methods that follow, an optical span is defined as a point-to-point optical fiber connection between two optical nodes. A first step in one method of identifying problematic optical spans is to identify optical paths between optical nodes within an optical network. Then the optical spans within each optical path are identified. FIG. 5A shows an example mesh oriented optical network with optical nodes A, B, C, D, and E. There are six (6) optical spans in the FIG. 5A network: the optical span between node A and node B (referred to as span AB), the optical span between node A and node C (referred to as span AC), the optical span between node A and node E (referred to as span AE), the optical span between node B and node C (referred to as span BC), the optical span between node C and node D (referred to as span CD), and the optical span between node D and node E (referred to as span DE). In practice, the optical span between two optical nodes typically consists of two optical spans (one for signals going in one direction between two nodes, and one for signals going in the opposite direction between the two nodes, as shown in the optical networks 200, 300, and 400). These may be referred to as bidirectional optical spans. Therefore, in the optical networks to follow (i.e., those of FIG. 5A, FIG. 5B, 6A, 7A, 8A, 9A, 10A, 11A, 12A, and 13A) each span between two given optical nodes will consist of two optical spans (one for each direction), however for the purpose of illustrating the methods of the present invention, it will be assumed (for simplicity) that the performance is identical for both directions of a given bidirectional optical span. However, in an actually fiber network this will not typically be the case, and the performance over each optical fiber within each bidirectional optical span between two nodes would need to be taken into account.

The two degree optical nodes B, D, and E can be the same as—for example—the optical node 100 shown in FIG. 1A, although they are not limited thereto. The three degree optical nodes A and C can be the same as—for example—the optical node 101 shown in FIG. 1G, although they are not limited thereto.

For the network of FIG. 5A, there are a maximum of ten (10) possible connections that can be made between the optical nodes of the network. A connection is made between a first node and a second node when a signal originates from the first optical node and terminates on the second optical node, or when the signal originates from the second optical node and terminates on the first optical node. For instance, a stream of packets may be sent from node A to node B. A list of the ten possible connections between the nodes of network of FIG. 5A are shown in the first column of the table of FIG. 5C. (Since for purposes of illustrating the methods of this invention, the performance in one direction of a given bidirectional optical span is considered to be the same as the performance in the opposite direction, only the optical paths between two nodes in one direction will be analyzed. Therefore, only the connection A to B is analyzed, and not the connection B to A, since the performance is assumed to be the same.) There may be a plurality of optical paths available to make a connection between two optical nodes. For example, in order to make a connection between node A and node B of the network shown in FIG. 5A, there are three possible optical paths that can be taken: node A to node B directly (referred to as path AB), node A to node B via Node C (referred to as path ACB), or node A to node B via nodes E, D, and C (referred to as path AEDCB). The optical paths available for each possible connection between nodes for the network shown in FIG. 5A are shown in columns 2 through 5 of the table shown in FIG. 5C (Path 1, Path 2, Path 3, and Path 4). As can be seen from the table shown in FIG. 5C, there are a total of 32 optical paths through the network shown in FIG. 5A (three optical paths for each connection, except for the connections from B to D and from B to E—which both have four possible optical paths). A method of identifying problematic optical spans within an optical network, according to one embodiment of the present invention, includes identifying optical paths between network nodes to test. Therefore, for the example network of FIG. 5A, the thirty-two paths listed in columns 2-5 of the table of FIG. 5C are all the identified optical paths to test of the optical network of FIG. 5A.

In a wavelength division multiplexed (WDM) optical network, a connection may be made by using a dedicated wavelength. For example, the connection between node A and node B may be made by using one wavelength, while the connection between node A and node C (via node B) may be made using another wavelength.

In an ideal network, all optical spans may exhibit the same ideal performance. For this case, any connection can be established between any two nodes using any optical path. In practice, each optical span will likely perform differently for a variety of reasons including (but not limited to): fiber length, fiber type, fiber impairments (e.g., chromatic dispersion (CD), polarization mode dispersion (PMD), etc.), excessive fiber loss (due to improper bend radius's or bad fiber splices), poor or faulty optical amplifiers, dirty optical connectors within the equipment at either end of the fiber span, non-linear effects, and so on. Performance impairments on optical spans typically result in a higher bit error rate for the connections utilizing such spans. Since forward error correction is utilized within most WDM networks, the forward error correction algorithms will often mask span impairments, resulting in acceptable bit error rates to end users on either end of a given connection. However, a network operator would like to know the "margin" (e.g., Optical Signal to Noise Ratio margin) associated with a given optical connection—that is to say—how close is the connection to performing badly or excessively badly (i.e., an excessively high error rate). Therefore, it may be beneficial for a network operator to not only avoid poorly performing optical spans, but also actively seek out poorly performing optical spans in order to perform some corrective action on the optical span (such as replacing it). When the performance of an optical span is evaluated, in addition to the fiber optic cabling itself, the optical equipment (i.e., ROADMs including amplifiers) on either end of the optical span and all optical connectors, optical patch panels, and optical splices must be taken into account, since a test signal sent over an optical span also traverses through the optical equipment and through the optical fiber connections internal to the optical node.

In order to implement methods of locating a problematic optical span within a network of optically connected nodes, ROADMs within the optical nodes comprise of an embedded optical transmitter operable to generate any optical wavelength within a band of wavelengths, an embedded optical receiver operable to receive any optical wavelength within the band of wavelengths, a means of forwarding the optical wavelength from the optical transmitter to any optical degree of the ROADM, a means of forwarding the optical wavelength from an optical degree to the embedded optical receiver, a means of generating a test signal over the wavelength generated by the optical transmitter, and a means of checking the test signal for errors within the optical receiver. The ROADMs 110, 111, 210*a-b*, 310*a-c*, and 410*a-c* of FIG. 1A, FIG. 1G, FIG. 2, FIG. 3 and FIG. 4 respectively comprise of these required elements.

In order to explain the methods of identifying problematic optical spans, the network examples of FIG. 5 to FIG. 13 will be used.

For purposes of illustrating the methods of the present invention, a span performance penalty ($\alpha$) can be assigned to each optical span within an optical network. The "span performance penalty" is a hypothetical construct used to analyze spans for the purposes of illustrating the concepts of this present invention. For the mesh network of FIG. 5A, each span has a span performance penalty of 1 ($\alpha=1$). For purposes of illustrating the methods of this invention, a span performance penalty of 1 indicates a good performing optical span. Span performance penalties greater than 1 are assigned to spans that suffer from various degrees of performance impairments (the higher the span performance penalty, the more degraded the optical span). A span performance penalty would be greater than 1 if the span suffers from one or more performance impairments (excessively long span, excessive chromatic dispersion, excessive PMD, excessive insertion loss, poor amplifier performance, etc.). For purposes of illustrating the methods of the present invention, if all optical spans of a given network have a span performance penalty of 1, then all connections through all optical paths of a given network are able to be made without incurring degraded performance (except where specifically noted). For purposes of illustrating methods of the present invention, the span performance penalties of all optical spans within an optical path can be added together in order to obtain a path performance penalty for an optical path. For the purposes of illustrating the present invention, this technique will be referred to as calculating the path performance penalty using an "additive" approach. (Alternatively, the span performance penalty of each optical span could be added together and divided by the total number of optical spans in the optical path to obtain a "normalized" path performance penalty.) Since the maximum number of spans in any optical path through the network of FIG. 5A is four, the maximum path performance penalty for any path through the network of FIG. 5A is 4 (assuming that the path performance penalty of an optical path is obtained by simply adding the span performance penalties of the spans of the optical path—the additive approach). If a span averaging technique were to be used to calculate a "normalized" path performance penalty, then all paths through the network of FIG. 5A would have a path performance of 1 (since adding up any number of spans with span performance penalties of 1, and dividing the total by the number of spans, results in a value of 1). For example purposes, using the network of FIG. 5A, and using the "additive" approach to calculate the path performance penalty, any path with a performance penalty of greater than 4 will be considered a degraded path (with resulting possible bit errors). The value of 4, for this case, can therefore be considered a "performance threshold". We can say that the defined performance threshold is 4 for this case. Therefore, an optical path is considered nondegraded (i.e., passing) if the path's performance penalty does not exceed the performance threshold (of 4), and a path is considered degraded (i.e., failing) if the path's performance penalty does exceed the performance threshold. In an actual optical network, exceeding the performance threshold may be analogous to exceeding a threshold that causes bit errors to occur, or causes non-correctable errors to occur for the case where forward error correction (FEC) is used. For these cases, the defined performance threshold is a bit error rate threshold, and identifying degraded optical paths between network nodes of a network is based upon the testing of the identified optical paths of the network, where the testing of the identified optical paths of the network comprises of transmitting a test signal over the identified optical paths of the network, and comparing the bit errors measured on identified optical paths between network nodes to a threshold.

If the embedded optical transmitters and optical receivers provide forward error correction support (such as the optical transmitter 150b of FIG. 1E and the optical receiver 180b of FIG. 1F), then the bit error rate threshold may be based upon a bit error rate that is determined following forward error correction at the optical receiver 180b, or the bit error rate threshold may be based upon a bit error rate that is determined prior to forward error correction at the optical receiver 180b, or the bit error rate threshold may be based upon a bit error rate that is determined following minimal forward error correction at the optical receiver 180b.

Although the apparatuses of FIG. 1A to FIG. 4 can be used to test both ends of a given optical span for bit error rate performance, the nature of the optical span could be such that when the optical span is tested by itself no bit errors may be incurred, but when the optical span is combined with additional optical spans (even additional optical spans that are not degraded), the combination of spans will trigger the threshold to be exceeded that causes bit errors to occur. Therefore, adding additional optical spans to an optical span when testing optical spans is a type of stress test for the optical span. Accordingly, a degraded optical span may be identified by running tests over multiple optical paths that contain the degraded optical span, and then observing the degraded optical paths, and noting the optical spans that the degraded optical paths have in common. The test may be to send a bit pattern over the optical path and then to observe the bit error rate performance of the path. FIG. 5B can be used to illustrate this method. The network of FIG. 5B is identical to that of the network of FIG. 5A, except that optical span AB has a span performance penalty of 3 ($\alpha$=3) instead of 1. Assume that the performance threshold in the network of FIG. 5B is 3. That is to say if any optical path's performance threshold exceeds 3, then the path is considered degraded (perhaps incurring bit errors, or perhaps incurring bit errors at a specifically defined rate). Then if a test signal is launched from node A and forwarded directly to node B (without going through any intervening nodes), and checked for errors at node B, the AB path will not be considered degraded (e.g., not incurring any bit errors), since the path performance penalty is 3 (since for the span AB $\alpha$=3), and therefore the path performance threshold is not exceeded. However, if the degraded optical span AB is combined with any other optical spans—and tested—then the path performance threshold will be exceeded (and bit errors may be recorded, for instance). Then by noting which combination of optical spans results in degraded optical path performance, the degraded span may be readily identified. For example, in the network of FIG. 5B, a bit error rate (BER) test may be run over the paths EAB, AED, ABC, and BCD, whose calculated path performance penalties are 4, 2, 4, and 2 respectively. The two degraded paths (EAB and ABC) have the common span of AB, while the two nondegraded paths do not contain the span AB, therefore the degraded optical span must be the span AB.

The thirty-two (32) possible paths through the network of FIG. 5B are identified in columns 2 through 5 of the table shown in FIG. 5C. For a given connection between two nodes (column 1 of the table of FIG. 5C), there are three to four possible paths available.

For a given connection, the optical spans used for the three to four possible optical paths can be identified, and the total number of times a given span is used in the three to four possible paths can be computed—shown in columns 6 to 11 in the table of FIG. 5C. In a real optical network, in order to locate problematics optical spans, the thirty-two paths listed in columns 2-5 of the table of FIG. 5C would be tested using the embedded optical transmitters 150 and embedded optical receivers 180 within the ROADMs 110, 111, 210a-b, 310a-b, 410a-b of the optical nodes, as described in reference to 100 of FIG. 1A, to 111 of FIG. 1G, to 200 of FIGS. 2, to 300 of FIGS. 3 and to 400 of FIG. 4. Each time an optical path is tested, the optical spans within the tested optical path are also tested. Therefore columns 6 to 11 in the table of FIG. 5C indicate the occurrences of each optical span within the 32 tested optical paths. For example, the connection from node A to node B within the network of FIG. 5B can be tested using three different optical paths (Path AB, Path ACB, and Path AEDCB), as indicated in the table of FIG. 5C. The optical span AB is tested only one time when the three optical paths of the connection from node A to node B are tested (as indicated in the $6^{th}$ column of the table of FIG. 5C of the row for connection A to B), while the optical span BC is tested two times when testing the three optical paths of connection A to B. (For the simplicity of illustrating the methods of the present invention, it is assumed that the performance of an optical span is the same in each direction, therefore for this case, optical span CB is the same as optical span BC.) It should be noted that in a very large optical network, it is likely that only a subset of the total number of optical paths between two nodes may be tested (perhaps the two or three most likely paths).

After all 32 optical paths have been tested; the total number of times a given optical span was tested is computed, by adding up the total number of times an optical span was tested over the testing of all 32 paths. These totals are shown in the last row of the table of FIG. 5C. Therefore, it can be seen that the optical span DE was tested a total of 14 times across all possible optical paths through the network of nodes shown in FIG. 5B.

In all likelihood, following testing of the 32 optical paths, some number of the 32 optical paths within the network of FIG. 5B will be identified as degraded paths. These are the paths that fail to meet a defined level of performance during the testing process. These degraded paths are also interchangeably referred to as failed optical paths. The table of FIG. 5D is used to compute the total number of times a given optical span was part of a degraded optical path (failed optical path) during the testing process. For the purposes of illustrating the methods of the present invention, the testing of the optical network of FIG. 5B is simulated by summing the span performance penalties (α) of the optical spans within each optical path (as previously discussed). To this end, each of the six optical spans of the network shown in FIG. 5B have been assigned a span performance penalty, wherein all span performance penalties are 1 except for optical span AB, which is 3. In order to compute the performance of each optical path, the span performance penalties of all the optical spans of each optical path are summed. The sum of the span performance penalties of an optical path will be referred to as the path performance penalty. For the purposes of illustrating the methods of the present invention, for the example network of FIG. 5B, any optical path with a path performance penalty greater than 4 (the path performance threshold for this example network) will be considered to be a degraded optical path (i.e., a failed optical path). The degraded optical paths are identified in columns 2 through 5 (2-5) in the table shown in FIG. 5D by underlining and italicizing the degraded (failed) optical paths. (Note: when the path performance penalty of an optical path exceeds the path performance penalty threshold of 4, it is akin to the performance of the optical path passing the threshold where bit errors may be beginning to occur.) As an example, the path performance penalty of the optical path BAED is equal to 5, and it is determined by adding the span performance penalties of spans BA, AE, and ED. Once the degraded optical paths (failed paths) are identified, the optical spans within those degraded paths (failed paths) are identified as degraded spans (failed spans) as well. Columns 6 to 11 of the table of FIG. 5D are used to tally up the degraded spans (failed spans) of the network of FIG. 5B. Then the total number of times a given span is recorded as degraded (failed) when testing all 32 optical paths is totaled up in the last row of the table in FIG. 5D. The table shown in FIG. 5E is used to summarize the results within the tables of FIG. 5C and FIG. 5D for the six spans of the network of FIG. 5B. The data within the last rows of the tables of FIG. 5C and FIG. 5D are carried over to columns 3 and 4 of the table shown in FIG. 5E. "Total Spans Passed" (column 5 of the table of FIG. 5E) is computed by subtracting "Total Spans Failed" (column 4 of the table of FIG. 5E) from "Total Spans Tested" (column 3 of the table of FIG. 5E). "Pass Ratio" (column 8 of the table of FIG. 5E) is computed by dividing "Total Spans Passed" (column 5 of the table of FIG. 5E) by "Total Spans Tested" (column 3 of the table of FIG. 5E). "Fail Ratio" (column 9 of the table of FIG. 5E) is computed by dividing "Total Spans Failed" (column 4 of the table of FIG. 5E) by "Total Spans Tested" (column 3 of the table of FIG. 5E). "Pass %" (column 6 of the table of FIG. 5E) is computed by multiplying "Pass Ratio" (column 8 of the table of FIG. 5E) by 100."Fail %" (column 7 of the table of FIG. 5E) is computed by multiplying "Fail Ratio" (column 9 of the table of FIG. 5E) by 100.

Observing the span pass percentages (column 6 of the table of FIG. 5E), it can clearly be seen that the span AB passes much less often than the other spans in the network (a mere 31% of the time). Therefore, the pass percentage column (column 6 of the table of FIG. 5E) clearly indicates that span AB is a degraded (and thus problematic) optical span.

In order to locate problematic optical spans, instead of using the span pass percentages (column 6 of the table of FIG. 5E) to identify problematic spans, it is sometimes possible to simply use the total number of times a given span fails (or the total number of times a given span passes) in comparison to the total number of times all other spans fail (or pass). As shown in column 4 of the table of FIG. 5E, it can be seen that the span AB fails much more often than any span, as the span AB failed 9 times, while the span with the second most number of failures fails only 6 times. Alternatively, span fail percentages (column 7 of the table of FIG. 5E) could be used to determine problematic spans, or "Total Spans Passed" (column 5 of the table of FIG. 5E) could be used to locate a problematic span.

As described above, a first method of identifying problematic optical spans, according to one embodiment of the present invention, comprises: identifying optical paths between network nodes to test (columns 2-5 of the table of FIG. 5C), testing identified optical paths between network nodes (by using optical transmitters 150 and optical receivers 180 embedded within ROADMs 210a-b, 310a-c, 410a-c as described in reference to 200 of FIGS. 2, to 300 of FIGS. 3 and to 400 of FIG. 4), identifying degraded optical paths between network nodes based upon testing (by comparing the performance of a given optical path to a performance threshold), counting occurrences of each optical span within the degraded optical paths between network nodes to create a "total" for each optical span (column 4 of the Table of FIG. 5E), and comparing optical spans using the "total" for each optical span (comparing optical spans using the information within column 4 of the table of FIG. 5E). The "total" for each optical span may be used directly to compare the optical spans of the given network in order to determine a problematic optical span. By examining the "total" for each optical span shown in column 4 of the table of FIG. 5E, it can be noticed that optical span AB failed far more times than any other span within the optical network of FIG. 5B (a total of nine times, compared to only six times for the next closest optical span). Therefore, by simply comparing the results shown in column 4 of FIG. 5E, it's clear that optical span AB is the worst performing optical span within the optical network of FIG. 5B.

A more accurate measure of the performance of an optical span is one that takes into account the number of times a given optical span has been tested. Accordingly, the first method of identifying problematic optical spans, according to one embodiment of the present invention, further comprises: counting the occurrences of each optical span within the identified optical paths (i.e., within the tested optical paths) between network nodes to create a "second total" for each optical span (column 3 of the table of FIG. 5E), and dividing the "total" for each optical span by the "second total" for each optical span to create a "third total" for each optical span (dividing column 4 of the table of FIG. 5E by column 3 of FIG. 5E, to get the results of column 9 of the table of FIG. 5E), wherein comparing the optical spans using the "total" for each optical span amounts to using the "total" for each optical span by dividing the "total" for each optical span (i.e., column 4 of the table of FIG. 5E) by the "second total" for each optical span (column 3 of the table of FIG. 5E), in order to compute a "third total" for each optical span, and then comparing the "third total" of each optical span. Therefore, according to the first method of identifying problematic optical spans, problematic optical spans may be identified by computing an average of how often a given optical span is part of a degraded optical path (i.e., comparing the data for each optical span of column 9 of the table of FIG. 5E). By examining the contents of the 9$^{th}$ column of the table of FIG. 5E, it can be observed that the optical span AB has the highest fail ratio of the optical spans of the network of FIG. 5B, and therefore optical span AB is the most problematic span.

Instead of identifying problematic optical spans by dividing the occurrences of each optical span within the degraded optical paths by the occurrences of each optical span within the identified optical paths and comparing the results of this computation for each optical span, one may alternatively identify problematic optical spans by dividing the occurrences of each optical span within the identified optical paths by the occurrences of each optical span within the degraded optical paths, and compare the results of this computation for each optical span. Accordingly, the first method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), and dividing the "second total" for each optical span by the "total" for each optical span to create a "third total" for each optical span (dividing column 3 of the table of FIG. 5E by column 4 of FIG. 5E, to get a result that is the reciprocal of the results of column 9 of the table of FIG. 5E), wherein comparing the optical spans using the "total" for each optical span amounts to using the "total" for each optical span by dividing the "second total" for each optical span (i.e., column 3 of the table of FIG. 5E) by the "total" for each optical span (column 4 of the table of FIG. 5E), in order to compute a "third total" for each optical span, and then comparing the "third total" of each optical span. When this is done, the lower the value of the "third total" for an optical span, then the more problematic that optical span is likely to be. For the optical spans of the network of FIG. 5B, the third totals for spans AB, BC, AC, AE, CD, and DE are 1.44, 2.60, 6.00, 3.00, 2.33, and 2.80 respectively (which is simply the reciprocal of the results of column 9). From these results, it can be readily observed that span AB is the most problematic optical span, as it has the lowest third total (1.44).

Alternatively, one may count the occurrences of each optical span within the degraded optical paths, and then obtain (i.e., compute) the number of occurrences of each optical span within the nondegraded optical paths by subtracting the occurrences of each optical span within the degraded optical paths from the occurrences of each optical span within the identified optical paths, and then compare optical spans by using the occurrences of each optical span within the nondegraded optical paths. Accordingly, the first method of identifying problematic optical spans, according to one embodiment of the present invention, further comprises: counting the occurrences of each optical span within identified optical paths between network nodes to create a second total for each optical span (column 3 of the table of FIG. 5E), subtracting the total for each optical span from the second total for each optical span to create a third total for each optical span (column 5 of the table of FIG. 5E, i.e., "Total Spans Passed"), wherein comparing optical spans using the total for each optical span amounts to subtracting the "total" for each optical span (column 4 of the table of FIG. 5E) from the "second total" for each optical span (i.e., column 3 of the table of FIG. 5E) in order to compute a "third total" for each optical span, and then comparing the "third total" of each optical span (i.e., column 5 of the table of FIG. 5E, i.e., "Total Spans Passed"). When comparing the total occurrences of optical spans passing (i.e., total of occurrences of an optical path within nondegraded paths), the lower the number of occurrences, the more likely a span is to be problematic. From column 5 of the table of FIG. 5E, it can be seen that the optical span AB is the most problematic, as it occurs in nondegraded optical paths only four (4) times, whereas all other optical spans occur in nondegraded paths at least eight (8) times.

Instead of comparing the number of times optical spans occur within a nondegraded path, a better measure is obtained by dividing the occurrences of an optical span within a nondegraded path by the occurrences of each optical span within the identified optical paths. Accordingly, the first method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), subtracting the "total" for each optical span (column 4 of the table of FIG. 5E) from the "second total" for each optical span (column 3 of the table of FIG. 5E) to obtain a "third total" for each optical span (column 5 of the table of FIG. 5E), and dividing the "third total" for each optical span by the "second total" for each optical span to create a "fourth total" for each optical span (dividing column 5 of the table of FIG. 5E by column 3 of FIG. 5E, to get the results of column 8 of the table of FIG. 5E, i.e., the Pass Ratio), wherein comparing the optical spans using the "total" for each optical span amounts to using the "total" for each optical span by subtracting the "total" for each optical span from the "second total" for each optical span, and then dividing the result by the "second total" for each optical span to create a Pass Ratio for each optical span, and comparing the Pass Ratios of each optical span. When comparing the Pass Ratios of each optical span, the lower the Pass Ratio of an optical span, the more likely the span is to be problematic. By observing the Pass Ratios of the optical span within the optical network of FIG. 5B (column 8 of the table of FIG. 5E), it can be observed that the optical span AB has the lowest Pass Ratio (0.31, compared to 0.57 for the next lowest), and so comparing the Pass ratios of the optical spans correctly identifies optical span AB as the problematic optical span.

Instead of identifying problematic optical spans by dividing the occurrences of each optical span within the nondegraded optical paths by the occurrences of each optical span within the identified optical paths and comparing the results of this computation for each optical span, one may alternatively identify problematic optical spans by dividing the occurrences of each optical span within the identified optical paths by the occurrences of each optical span within the nondegraded optical paths and compare the results of this computation for each optical span. Accordingly, the first method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), subtracting the "total" for each optical span (column 4 of the table of FIG. 5E) from the "second total" for each optical span (column 3 of the table of FIG. 5E) to obtain a "third total" for each optical span (column 5 of the table of FIG. 5E), and dividing the "second total" for each optical span by the "third total" for each optical span to create a "fourth total" for each optical span (dividing column 3 of the table of FIG. 5E by column 5 of FIG. 5E, to get the reciprocal of the results of column 8 of the table of FIG. 5E), wherein comparing the optical spans using the "total" for each optical span amounts to using the "total" for each optical span by subtracting the "total" for each optical span from the "second total" for each optical span to create a "third total" for each optical span, and then dividing "second total" for each optical span by the "third total" for each optical span to create a "fourth total" for each optical span, and then comparing the "fourth total" of each optical span. For this case, the larger the fourth total, the more likely the optical span is to be problematic. For the optical spans of the network of FIG. 5B, the optical span AB has the largest "fourth total" (3.25), so it would be correctly identified as the problematic optical span.

As described above, the first method of identifying problematic optical spans, according to one embodiment of the present invention, includes identifying optical paths between optical nodes of a network. One method of identifying optical paths between optical nodes of a network comprises: determining all possible node-to-node connections between each node and all other nodes within the network (i.e. determining the information within the first column of the table in FIG. 5C) by visually inspecting a diagram of the network (such as the network diagram shown in FIG. 5B), and determining all possible optical paths between the two nodes of each node-to-node connection (i.e. determining the information within the columns 2 to 5 of the table in FIG. 5C) by visually inspecting a diagram of the network. Another method of identifying optical paths between optical nodes of a network may comprise: entering the optical nodes of the network into a computer, entering the fiber optic interconnections between the optical nodes of the network into a computer, executing a first computer program within the computer to determine all possible node-to-node connections (column 1 of the table of FIG. 5C) between each node and all other nodes within the network, and executing a second computer program within a computer to determine all possible optical paths (columns 2-5 of the table of FIG. 5C) between the two nodes of each node-to-node connection.

Another method of identifying optical paths between optical nodes of a network may comprise: sending discovery messages between optical nodes to determine the nodes that are adjacent to each node, executing a first computer program within a computer to construct a diagram of the network based upon the information obtained by sending the discovery messages between optical nodes, executing a second computer program within the computer to determine all possible node-to-node connections between each node and all other nodes within the network, and executing a third computer program within a computer to determine all possible optical paths between the two nodes of each node-to-node connection.

The first method of identifying problematic optical spans, according to one embodiment of the present invention, further comprises testing identified optical paths between network nodes. One method of testing optical paths between network nodes comprises, tuning the output of an optical transmitter 150 embedded within a first reconfigurable optical add-drop multiplexer circuit pack 210a of a first optical node to a wavelength within a band of wavelengths, generating a test signal over the wavelength, configuring the first reconfigurable optical add-drop multiplexer circuit pack 210a to forward the wavelength to an optical path 270, receiving the wavelength from the optical path 270 at a second reconfigurable optical add-drop multiplexer circuit pack 210b of a second optical node, configuring the second reconfigurable optical add-drop multiplexer circuit pack 210b to forward the wavelength to an optical receiver embedded 180 within the second reconfigurable optical add-drop multiplexer circuit pack 210b, and recording a performance of the test signal at the second reconfigurable optical add-drop multiplexer circuit pack 210b using the optical receiver 180 embedded within the second reconfigurable optical add-drop multiplexer circuit pack 210b.

With respect to the method of testing optical paths between network nodes as described above, a port 168 of the first reconfigurable optical add-drop multiplexer circuit pack 210a used to connect to an optical multiplexer 191 may be operable to only receive wavelengths of a second band of wavelengths, wherein the second band of wavelengths is smaller than the band of wavelengths.

Another method of testing optical paths between network nodes comprises, generating a signal along the optical paths (using an optical transmitter 150 embedded within a ROADM circuit pack 210a to generate the signal, and configuring wavelength equalizers 120a-g within ROADMs 210a-b to guide the signal from the optical transmitter 150 along the optical paths 270), and identifying those optical paths that exceed a defined performance threshold as degraded optical paths (wherein an optical receiver embedded 180 within a ROADM circuit pack 210b compares the performance of the signal to a defined performance threshold to determine those optical paths that exceed the defined performance threshold, and wherein the optical receiver 180 embedded within a ROADM circuit pack 210b declares those optical paths that exceed the defined performance threshold as being degraded). More specifically, generating a signal along identified optical paths and identifying those optical paths that exceed a defined performance threshold as degraded (i.e., failing) optical paths can be done by generating a test signal over a wavelength using an embedded optical transmitter 150 within a first ROADM 410a of an optical node at one end of the optical path, configuring the first ROADM 410a of the optical node to pass the wavelength onto an optical span 471 connected to an optical degree 160 of the first ROADM 410a, configuring one or more intermediate ROADMs 410b to pass the received wavelength to intermediate optical spans 476 of the optical path, configuring the last ROADM 410c at the other end of the optical path to pass the received wavelength with the test signal to an embedded optical receiver 180 within the last ROADM 410c, checking the test signal at the embedded optical receiver to determine if the performance of the optical path exceeded the defined performance threshold, and identifying the optical path as a failed optical path if the performance of the test signal exceeded the defined performance threshold. In the network shown in FIG. 5B, all 32 identified paths in columns 2-5 of the table in FIG. 5C are tested, and columns 6-11 are used to count the number of times (occurrences) each individual optical span is tested when testing the 32 optical paths. Columns 2-5 of the table shown in FIG. 5D also shows the 32 optical paths tested, but in addition, the optical paths that exceeded the defined performance threshold are marked by underlining an italicizing those paths. In the table of FIG. 5D, it can be seen that 9 of the 32 optical paths failed.

When generating the signal along the optical path, a reserved wavelength may be used. The reserved wavelength is a wavelength that is reserved for internal optical network testing only, and therefore it is a wavelength that is outside of the set of wavelengths used to transport end user signals. Therefore, optical transmitters attached to the optical multiplexer 191 (of FIG. 1A) would not support the wavelength frequency of the reserved wavelength.

Another method of testing optical paths between network nodes comprises, generating a signal along the optical paths (using an optical transmitter 150 embedded within a ROADM circuit pack 210a to generate the signal, and configuring wavelength equalizers 120a-g within ROADMs 210a-b to guide the signal from the optical transmitter 150 along the optical paths 270), and identifying those optical paths that exceed a bit error rate threshold as degraded optical paths (wherein an optical receiver embedded 180 within a ROADM circuit pack 210b compares the bit error rate of the signal to a bit error rate threshold and identifies those optical paths that exceed the bit error rate threshold as degraded optical paths), wherein the bit error rate threshold is based upon a first bit error rate determined prior to forward error correction, or on a second bit error rate determined following minimal forward error correction, or on a third bit error rate determined following maximum forward error correction.

Instead of testing to identify degraded optical paths between network nodes, testing could be done to identify "nondegraded" optical paths between network nodes. Therefore, a second method of identifying problematic optical spans, according to one embodiment of the present invention, comprises: identifying optical paths between network nodes to test (columns 2-5 of the table of FIG. 5C), testing identified optical paths between network nodes (by using optical transmitters 150 and optical receivers 180 embedded within ROADMs 210a-b,310a-c, 410a-c as described in reference to 200 of FIGS. 2, to 300 of FIGS. 3 and to 400 of FIG. 4), identifying nondegraded optical paths between network nodes based upon testing (by comparing the performance of a given optical path to a performance threshold), counting occurrences of each optical span within the nondegraded optical paths between network nodes to create a "total" for each optical span (column 5 of the Table of FIG. 5E), and comparing optical spans using the "total" for each optical span (comparing optical spans using the information within column 5 of the table of FIG. 5E). The "total" for each optical span may be used directly to compare the optical spans of the given network in order to determine a problematic optical span. By examining the "total" for each optical span shown in column 5 of the table of FIG. 5E, it can be noticed that optical span AB was part of nondegraded spans (i.e., passed) far less times than any other span within the optical network of FIG. 5B (a total of only four times, compared to only eight times for the next closest optical span). Therefore, by simply comparing the results shown in column 5 of FIG. 5E, it's clear that optical span AB is the worst performing optical span within the optical network of FIG. 5B.

A more accurate measure of the performance of an optical span is one that takes into account the number of times a given optical span has been tested. Accordingly, the second method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), and dividing the "total" for each optical span by the "second total" for each optical span to create a "third total" for each optical span (dividing column 5 of the table of FIG. 5E by column 3 of FIG. 5E, to get the results of column 8 of the table of FIG. 5E), wherein comparing the optical spans using the "total" for each optical span amounts to using the "total" for each optical span by dividing the "total" for each optical span (i.e., column 5 of the table of FIG. 5E) by the "second total" for each optical span (column 3 of the table of FIG. 5E), in order to compute a "third total" for each optical span (column 8 of the table of FIG. 5E), and then comparing the "third total" of each optical span. Therefore, according to the second method of identifying problematic optical spans, problematic optical spans may be identified by computing an average of how often a given optical span is part of a nondegraded optical path (i.e., comparing the data for each optical span of column 8 of the table of FIG. 5E). By examining the contents of the $8^{th}$ column of the table of FIG. 5E, it can be observed that the optical span AB has the lowest past ratio of the optical spans of the network of FIG. 5B, and therefore optical span AB is the most problematic span.

Instead of identifying problematic optical spans by dividing the occurrences of each optical span within the nondegraded optical paths by the occurrences of each optical span within the identified optical paths and comparing the results of this computation for each optical span, one may alternatively identify problematic optical spans by dividing the occurrences of each optical span within the identified optical paths by the occurrences of each optical span within the nondegraded optical paths and compare the results of this computation for each optical span. Accordingly, the second method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), and dividing the "second total" for each optical span by the "total" for each optical span to create a "third total" for each optical span (dividing column 3 of the table of FIG. 5E by column 5 of FIG. 5E, to get a result that is the reciprocal of the results of column 8 of the table of FIG. 5E), wherein comparing the optical spans using the "total" for each optical span amounts to using the "total" for each optical span by dividing the "second total" for each optical span (i.e., column 3 of the table of FIG. 5E) by the "total" for each optical span (column 5 of the table of FIG. 5E), in order to compute a "third total" for each optical span, and then comparing the "third total" of each optical span. When this is done, the higher the value of the "third total" for an optical span, then the more problematic that optical span is likely to be. For the optical spans of the network of FIG. 5B, the third totals for spans AB, BC, AC, AE, CD, and DE are 3.25, 1.63, 1.20, 1.5, 1.75, and 1.56 respectively (which is simply the reciprocal of the results of column 8). From these results, it can be readily observed that span AB is the most problematic optical span, as it has the highest "third total" (3.25).

Alternatively, one may count the occurrences of each optical span within the nondegraded optical paths, and then obtain the number of occurrences of each optical span within the degraded optical paths by subtracting the occurrences of each optical span within the nondegraded optical paths from the occurrences of each optical span within the identified optical paths, and then compare optical spans by using the occurrences of each optical span within the degraded optical paths. Accordingly, the second method of identifying problematic optical spans, according to one embodiment of the present invention, further comprises: counting the occurrences of each optical span within identified optical paths between network nodes to create a "second total" for each optical span (column 3 of the table of FIG. 5E), and subtracting the "total" for each optical span from the "second total" for each optical span to create a "third total" for each optical span (column 4 of the table of FIG. 5E, i.e., "Total Spans Failed"), wherein comparing optical spans using the total for each optical span amounts to subtracting the "total" for each optical span (column 5 of the table of FIG. 5E) from the "second total" for each optical span (i.e., column 3 of the table of FIG. 5E) in order to compute a "third total" for each optical span, and then comparing the "third total" of each optical span (i.e., column 4 of the table of FIG. 5E, i.e., "Total Spans Failed"). When comparing the total occurrences of optical spans failing (i.e., total of occurrences of an optical path within degraded paths), the higher the number of occurrences, the more likely a span is to be problematic. From column 4 of the table of FIG. 5E, it can be seen that the optical span AB is the most problematic, as it occurs in degraded optical paths nine (9) times, whereas all other optical spans occur in degraded paths no more than six (6) times.

Instead of comparing the number of times optical spans occur within a degraded path, a better measure is obtained by dividing the occurrences of an optical span within a degraded path by the occurrences of each optical span within the identified optical paths. Accordingly, the second method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), subtracting the "total" for each optical span (column 5 of the table of FIG. 5E) from the "second total" for each optical span (column 3 of the table of FIG. 5E) to obtain a "third total" for each optical span (column 4 of the table of FIG. 5E), and dividing the "third total" for each optical span by the "second total" for each optical span to create a "fourth total" for each optical span (dividing column 4 of the table of FIG. 5E by column 3 of FIG. 5E, to get the results of column 9 of the table of FIG. 5E, i.e., the Fail Ratio), wherein comparing the optical spans using the "total" for each optical span amounts to using the "total" for each optical span by subtracting the "total" for each optical span from the "second total" for each optical span, and then dividing the result by the "second total" for each optical span to create a Fail Ratio for each optical span, and comparing the Fail Ratios of each optical span. When comparing the Fail Ratios of each optical span, the higher the Fail Ratio of an optical span, the more likely the span is to be problematic. By observing the Fail Ratios of the optical spans within the optical network of FIG. 5B (column 9 of the table of FIG. 5E), it can be observed that the optical span AB has the highest Fail Ratio (0.69, compared to 0.43 for the next highest), and so comparing the Fail ratios of the optical spans correctly identifies optical span AB as the problematic optical span.

Instead of identifying problematic optical spans by dividing the occurrences of each optical span within the degraded optical paths by the occurrences of each optical span within the identified optical paths and comparing the results of this computation for each optical span, one may alternatively identify problematic optical spans by dividing the occurrences of each optical span within the identified optical paths by the occurrences of each optical span within the degraded optical paths and compare the results of this computation for each optical span. Accordingly, the second method of identifying problematic optical spans, according to one embodiment of the present invention, further comprises: counting the occurrences of each optical span within the identified optical paths (i.e., the tested optical paths) between network nodes to create a "second total" for each optical span (column 3 of the table of FIG. 5E), subtracting the "total" for each optical span (column 5 of the table of FIG. 5E) from the "second total" for each optical span (column 3 of the table of FIG. 5E) to obtain a "third total" for each optical span (column 4 of the table of FIG. 5E), and dividing the "second total" for each optical span by the "third total" for each optical span to create a "fourth total" for each optical span (dividing column 3 of the table of FIG. 5E by column 4 of FIG. 5E, to get the reciprocal of the results of column 9 of the table of FIG. 5E), wherein comparing the optical spans using the "total" for each optical span amounts to using the "total" for each optical span by subtracting the "total" for each optical span from the "second total" for each optical span to create a "third total" for each optical span, and then dividing "second total" for each optical span by the "third total" for each optical span to create a "fourth total" for each optical span, and then comparing the "fourth total" of each optical span. For this case, the smaller the fourth total, the more likely the optical span is to be problematic. For the optical spans of the network of FIG. 5B, the optical span AB has the smallest "fourth total" (1.44), so it would be correctly identified as the problematic optical span.

As described above, the first method of identifying problematic optical spans, according to one embodiment of the present invention, and the second method of identifying problematic optical spans, according to one embodiment of the present invention, includes identifying optical paths between optical nodes of a network. One method of identifying optical paths between optical nodes of a network comprises: determining all possible node-to-node connections between each node and all other nodes within the network (i.e. determining the information within the first column of the table in FIG. 5C) by visually inspecting a diagram of the network (such as the network diagram shown in FIG. 5B), and determining all possible optical paths between the two nodes of each node-to-node connection (i.e. determining the information within the columns 2 to 5 of the table in FIG. 5C) by visually inspecting a diagram of the network. Another method of identifying optical paths between optical nodes of a network may comprise: entering the optical nodes of the network into a computer, entering the fiber optic interconnections between the optical nodes of the network into a computer, executing a first computer program within the computer to determine all possible node-to-node connections between each node and all other nodes within the network, and executing a second computer program within a computer to determine all possible optical paths between the two nodes of each node-to-node connection.

Another method of identifying optical paths between optical nodes of a network may comprise: sending discovery messages between optical nodes to determine the nodes that are adjacent to each node, executing a first computer program within a computer to construct a diagram of the network based upon the information obtained by sending the discovery messages between optical nodes, executing a second computer program within the computer to determine all possible node-to-node connections between each node and all other nodes within the network, and executing a third computer program within a computer to determine all possible optical paths between the two nodes of each node-to-node connection.

A third method of identifying problematic optical spans, according to one embodiment of the present invention, comprises incrementing optical span failure counts for those optical spans within failing (degraded) optical paths. For the example of the network of FIG. 5B, each optical path comprises of a number of concatenated optical spans. For example, failed optical path CBAED is comprised of the spans CB, BA, AE, and ED. Since for purposes of illustrating the methods of the present invention, it is assumed that the performance of both optical fiber spans between two optical nodes are identical, in columns 6-11 of the table of FIG. 5D, for the failed optical path CBAED the spans AB (=BA), BC (=CB), AE, and DE (=ED) are indicated as failed spans. The last row of the table in FIG. 5D shows the span failure counts (degraded span counts) of each optical span in the network. After an optical path is tested, if the optical path is determined to be degraded (i.e., the performance of the tested optical path exceeded the performance threshold, and thereby the path is identified as a degraded/failed optical path) the span failure counts are appropriately incremented. For example, after the optical path CBAED is tested, the span failure counts for optical spans AB, BC, AE, and DE are each incremented by 1.

The third method of identifying problematic optical spans, according to one embodiment of the present invention, further comprises comparing optical span failure counts of the optical spans. In the last row of the table in FIG. 5D, the optical span failure counts of each optical span within the optical network shown in FIG. 5B are shown. By comparing the optical span failure counts of each of the optical spans, it can be noticed that the optical span failure count of span AB is much greater than the optical span failure counts of all other spans (i.e., an optical span failure count of 9 compared to optical span failure counts of 5, 2, 5, 6,and 5 for the other optical spans of the optical network). Since the total number of times each optical span was tested was approximately the same (see the last row of the table of FIG. 5C), the optical span failure count for optical span AB is a good indication that optical span AB is a problematic optical span, which is indeed the case, as according to the performance penalties of the optical spans of the network of FIG. 5B, optical span AB has a performance penalty that is three times as large as all other optical spans ($\alpha=3$ compared to $\alpha=1$ for all other spans).

FIG. 6A shows the same network as shown in FIG. 5B, except that optical span DE (instead of span AB) is the problematic optical span (as indicated by the span performance penalties). Since the topology of the network of FIG. 6A is the same as the topology of the network of FIG. 5B, the table shown in FIG. 5C applies to the network of FIG. 6A. FIG. 6B shows the total occurrences of optical spans within optical paths of the network of FIG. 6A that have been determined to be degraded (using the methods discussed in reference to the network of FIG. 5B). The results shown in FIG. 6C show that span (DE) is correctly identified as the problematic optical span, since its pass percentage (column 6 of the table of FIG. 6C) is only 21% compared to at least 50% for all the other optical spans.

FIG. 7A shows the same network as shown in FIG. 5B, except that optical span AC (instead of span AB) is the problematic optical span (as indicated by the span performance penalties). Since the topology of the network of FIG. 7A is the same as the topology of the network of FIG. 5B, the table shown in FIG. 5C applies to the network of FIG. 7A. FIG. 7B shows the total occurrences of optical spans within optical paths of the network of FIG. 7A that have been determined to be degraded (using the methods discussed in reference to the network of FIG. 5B). The results shown in FIG. 7C show that span (AC) is correctly identified as the problematic optical span, since its pass percentage (column 6 of the table of FIG. 7C) is only 42% compared to at least 71% for all the other optical spans.

FIG. 8A shows the same network as shown in FIG. 5B, except that optical spans AB and BC (instead of just span AB) are the problematic optical span (as indicated by the span performance penalties). Since the topology of the network of FIG. 8A is the same as the topology of the network of FIG. 5B, the table shown in FIG. 5C applies to the network of FIG. 8A. FIG. 8B shows the total occurrences of optical spans within optical paths of the network of FIG. 8A that have been determined to be degraded (using the methods discussed in reference to the network of FIG. 5B). The results shown in FIG. 8C show that spans AB and BC are correctly identified as the problematic optical spans, since they have the lowest pass percentages of the optical spans (as indicated in column 6 of the table of FIG. 8C).

FIG. 9A shows the same network as shown in FIG. 5B, except that optical spans AB and DE (instead of just span AB) are the problematic optical span (as indicated by the span performance penalties). Since the topology of the network of FIG. 9A is the same as the topology of the network of FIG. 5B, the table shown in FIG. 5C applies to the network of FIG. 9A. FIG. 9B shows the total occurrences of optical spans within optical paths of the network of FIG. 9A that have been determined to be degraded (using the methods discussed in reference to the network of FIG. 5B). The results shown in FIG. 9C show that spans AB and DE are correctly identified as potential problematic optical spans, since they have the lowest pass percentages of the optical spans (as indicated in column 6 of the table of FIG. 9C). It's logical that span AE has the third worst pass percentage, since it lies between spans AB and DE, so it is often paired with one or both of those spans when testing optical paths.

FIG. 10A shows the same network as shown in FIG. 5B, except that optical span DE (instead of span AB) is the problematic optical span (as indicated by the span performance penalties), and optical span AC has been removed, thereby creating a "ring network". Since the network of FIG. 10A has a different topology than that of the network of FIG. 5B, a new table is generated (the table of FIG. 10B) showing the total occurrences of the various optical spans within the tested optical paths. It can be noted from the table of FIG. 10B that the number of possible optical paths is reduced from 32 to 20 once optical span AC is removed from the network of FIG. 5B. FIG. 10C shows the total occurrences of optical spans within optical paths of the network of FIG. 10A that have been determined to be degraded (using the methods discussed in reference to the network of FIG. 5B). The results shown in FIG. 10D show that span (DE) is correctly identified as the problematic optical span, since its pass percentage (column 6 of the table of FIG. 10D) is only 30% compared to at least 50% for all the other optical spans. Therefore, the technique used to identify problematic spans works on ring networks.

Figures 11A, 11B:
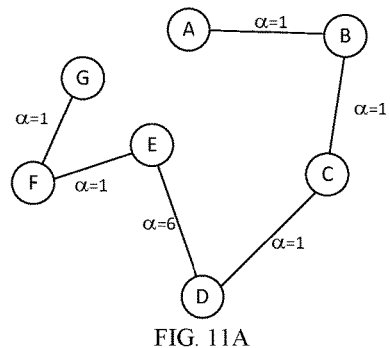
FIG. 11A is a first example linear network diagram.
FIG. 11B is a table that describes the optical paths through the first example linear network.

FIG. 11A shows a linear network. Since the longest path in this network is six spans (path ABCDEFG), the path performance penalty threshold for this network is set to 6. Therefore, if all spans have span performance penalties of 1, no problematic paths will exist in the network. In the network of FIG. 11A, however, span DE's span performance is arbitrarily set to 6, while the span performance penalties for all other spans are set to 1. Since the network of FIG. 11A has a different topology than that of the networks of FIG. 5B and FIG. 10A, a new table is generated (the table of FIG. 11B) showing the total occurrences of the various optical spans within the tested optical paths. FIG. 11C shows the total occurrences of optical spans within optical paths of the network of FIG. 11A that have been determined to be degraded (using the methods discussed in reference to the network of FIG. 5B). The results shown in FIG. 11D show that span DE is correctly identified as the problematic optical span, since its pass percentage (column 6 of the table of FIG. 11D) is only 8% compared to at least 20% for all the other optical spans. It's logical that optical spans EF and CD have the next worst pass percentages, as these two optical spans lie on either side of span DE, and therefore they are the two spans that most often get paired with span DE when forming optical paths. It's also logical that the optical span AB has the best pass percentage, since it is the optical span that is furthest away from the problematic span, and therefore is the optical span that is the least likely to get paired with optical span DE when forming optical paths. For a linear network, the observation can be made that the pass percentage of a given optical span is directly proportional to the given span's distance from the problematic optical span in a network with one problematic span (the further the distance, the higher the pass percentage). This observation can be extended to the ring network as well as mesh networks, but it is somewhat less apparent in the example networks presented as part of the present invention. With this said, in the ring network of FIG. 10A, the two spans that are the farthest away (spans AB and BC) from the problematic optical span DE, also have the highest pass percentages (60%, as noted from the table of FIG. 10D).

The network of FIG. 12A is the same network as the network shown in FIG. 11A, except that span EF has the high span performance penalty (instead of span DE). Since the topology of the network of FIG. 12A is the same as the topology of the network of FIG. 11A, the table shown in FIG. 11B applies to the network of FIG. 12A. FIG. 12B shows the total occurrences of optical spans within optical paths of the network of FIG. 12A that have been determined to be degraded (using the methods discussed in reference to the network of FIG. 5B). The results shown in FIG. 12C show that optical span EF is correctly identified as the most problematic optical span, since its pass percentage (column 6 of the table of FIG. 12C) is lowest of all optical spans at only 10%. It can also be noted that the span FG also has a very low pass percentage (17%). This is because optical span FG must always be combined with the problematic span EF when forming an optical path, except for the case of the optical path that is simply FG. It should also be noted that the pass percentages of optical spans AB, BC, and CD, all went up compared to their corresponding pass percentages in the network of FIG. 11A, since all three spans are now further away from the problematic span in the network.

The network of FIG. 13A has is the same as the optical network of FIG. 11A, except that optical spans DE and EF (instead of just span DE) are the problematic spans (as indicated by the span performance penalties). Since the topology of the network of FIG. 13A is the same as the topology of the network of FIG. 11A, the table shown in FIG. 11B applies to the network of FIG. 13A. FIG. 13B shows the total occurrences of optical spans within optical paths of the network of FIG. 13A that have been determined to be degraded (using the methods discussed in reference to the network of FIG. 5B). The results in the table of FIG. 13C show that the problematic optical spans are correctly identified, as it can be seen (from column 6 of the table of FIG. 13C) that optical spans DE and EF have the lowest pass percentages of the optical spans. Once again it can be seen that the span AB has the highest pass percentage, since it is the furthest away from the two problematic spans.

Instead of simply comparing the performance of an optical path to one threshold, the performance of an optical path may be compared to multiple thresholds, representing increasing levels of performance. Each optical path can then be assigned a metric of performance based upon the optical path's performance with respect to the plurality of thresholds. In turn, the optical spans within the optical paths may be assigned the metric of performance assigned to the optical paths. Then, for a given optical span, a performance average could be obtained by determining the average metric of performance of the span.

The network of FIG. 5B will be used to illustrate how comparing an optical path to multiple thresholds could be used to identify poorly performing (i.e., degraded or problematic) spans. Assuming the span performance penalties depicted in FIG. 5B, the path performance penalty of a given optical path can be computed (as before) by adding up the span performance penalties of all the optical spans in the optical path. Then, if the path performance penalty is less than 5, the path may be assigned a first metric of performance (say 1). If the path performance penalty is equal to 5, then the path may be assigned a higher metric of performance (say 2). If the path performance penalty is equal to 6, then the path may be assigned an even a higher metric of performance (say 3). This is equivalent to comparing the performance of the path to three different thresholds (perhaps three different bit error rates), and assigning a somewhat arbitrary metric of performance to the path depending upon how the path's performance compares to the three thresholds. For this example, a path performance penalty of 4 or less may equate to an error free path, while a path performance penalty of 5 may correspond to a bit error rate of say 1e−14, while a path performance penalty of 6 may correspond to a bit error rate of say 1e−12. For this example, a lower metric of performance for a path equates to better performing path.

The table in FIG. 14 depicts the results of analyzing the network of FIG. 5B using three thresholds and three metrics of performance for the paths (as discussed above). As shown, a metric of performance is assigned to each of the 32 paths shown in the table of FIG. 14 (columns 2-5). These corresponding path metrics of performance are assigned to the optical spans within the corresponding optical paths (as shown in columns 6-11 of the table of FIG. 14). The average metric of performance for each span is shown in the last row of the table in FIG. 14. As can be readily seen, the span AB—with a metric of performance of 2.0—is the worst performing span. The average metric of performance for a span is calculated by adding up all of the span metric of performances for a given span, and then dividing the total (shown in the second to the last row of the table of FIG. 14) by the total number of times a given span was tested (namely the Totals shown in the last column of the table of FIG. 5C). Therefore, the average metric of performance for the optical span AB of the network of FIG. 5B is calculated as:

$$AB_{avg}=1+1+2+3+(1+3)+(2+2)+(1+3)+3+2+2=26$$

It can be noticed that the single threshold used in the computation of the tables of FIG. 5C to FIG. 5E, can be used to generate metrics of performance for each span. For this case, each path may be assigned a metric of performance of either 0 or 1. If the path penalty of a path is less than 5,than the path is assigned a metric of performance of 0, otherwise it is assigned a metric of performance of 1. FIG. 15 then shows the table of FIG. 14 equivalent for the calculation of the metric of performance for the spans in the FIG. 5B network. As can be seen from the table in FIG. 15, the span with the highest metric of performance is span AB with a metric of performance of 0.69, corresponding to the most problematic span in the network of FIG. 5B.

It should be noted that if an optical transmitter and an optical receiver that are embedded into a ROADM are used to test the optical paths of an optical network, and if a wavelength value is used that is outside of the set of wavelength values used to transport end user signals, testing of the optical paths of a given network can be done continuously, while transporting end user signals. Plus, using methods to stress the optical paths, problematic optical spans can be identified and repaired prior to the problematic optical spans affecting end user signals.

In the foregoing description, the invention is described with reference to specific example embodiments thereof. It will, however, be evident that various modifications and changes may be made thereto without departing from the broader spirit and scope of the present invention. The specification and drawings are accordingly to be regarded in an illustrative rather than restrictive sense.

The invention claimed is:

1. A method of identifying problematic optical spans, comprising:
identifying optical paths between network nodes;
testing identified optical paths between network nodes;
identifying degraded optical paths between network nodes based upon testing;
counting occurrences of each optical span within the degraded optical paths between network nodes to create a total for each optical span; and
comparing optical spans using the total for each optical span,
wherein testing identified optical paths between network nodes comprises:
tuning the output of an optical transmitter embedded within a first reconfigurable optical add-drop multiplexer circuit pack of a first optical node to a wavelength within a band of wavelengths;
generating a test signal over the wavelength;
forwarding the wavelength to an optical path;
receiving the wavelength from the optical path at a second reconfigurable optical add-drop multiplexer circuit pack of a second optical node; and
recording a performance of the test signal at the second reconfigurable optical add-drop multiplexer circuit pack using an optical receiver embedded within the second reconfigurable optical add-drop multiplexer circuit pack.

2. The method of claim 1, further comprising:
counting occurrences of each optical span within identified optical paths between network nodes to create a second total for each optical span; and
dividing the total for each optical span by the second total for each optical span to create a third total for each optical span,
wherein comparing optical spans comprises comparing the third total for each optical span.

3. The method of claim 1, further comprising:
counting occurrences of each optical span within identified optical paths between network nodes to create a second total for each optical span; and
dividing the second total for each optical span by the total for each optical span to create a third total for each optical span,
wherein comparing optical spans comprises comparing the third total for each optical span.

4. The method of claim 1, further comprising:
counting occurrences of each optical span within identified optical paths between network nodes to create a second total for each optical span; and
subtracting the total for each optical span from the second total for each optical span to create a third total for each optical span,
wherein comparing optical spans comprises comparing the third total for each optical span.

5. The method of claim 1, further comprising:
counting occurrences of each optical span within identified optical paths between network nodes to create a second total for each optical span;
subtracting the total for each optical span from the second total for each optical span to create a third total for each optical span; and
dividing the third total for each optical span by the second total for each optical span to create a fourth total for each optical span,
wherein comparing optical spans comprises comparing the fourth total for each optical span.

6. The method of claim 1, further comprising:
counting occurrences of each optical span within identified optical paths between network nodes to create a second total for each optical span;
subtracting the total for each optical span from the second total for each optical span to create a third total for each optical span; and
dividing the second total for each optical span by the third total for each optical span to create a fourth total for each optical span,
wherein comparing optical spans comprises comparing the fourth total for each optical span.

7. The method of claim 1, further comprising:
configuring the first reconfigurable optical add-drop multiplexer circuit pack to forward the wavelength to the optical path; and
configuring the second reconfigurable optical add-drop multiplexer circuit pack to forward the wavelength to the optical receiver.

8. The method of claim 1, wherein a port of the first reconfigurable optical add-drop multiplexer circuit pack used to connect to an optical multiplexer is operable to only receive wavelengths of a second band of wavelengths, wherein the second band of wavelengths is smaller than the band of wavelengths.

9. The method of claim 1, wherein identifying degraded optical paths between network nodes based upon testing comprises of
identifying those optical paths that exceed a defined performance threshold as degraded optical paths.

10. The method of claim 1, wherein identifying degraded optical paths between network nodes based upon testing comprises of
identifying those optical paths that exceed a bit error rate threshold as degraded optical paths.

11. The method of claim 10, wherein identifying those optical paths that exceed the bit error rate threshold comprises at least one of:
measuring a first bit error rate prior to forward error correction and comparing the first bit error rate to a first bit error rate threshold,
measuring a second bit error rate following minimal forward error correction and comparing the second bit error rate to a second bit error rate threshold, and
measuring a third bit error rate following maximal forward error correction and comparing the third bit error rate to a third bit error rate threshold.

12. A method of identifying problematic optical spans, comprising:
identifying optical paths between network nodes;
testing identified optical paths between network nodes;
identifying nondegraded optical paths between network nodes based upon testing;
counting occurrences of each optical span within the nondegraded optical paths between network nodes to create a total for each optical span; and
comparing optical spans using the total for each optical span,
wherein testing identified optical paths between network nodes comprises:
tuning the output of an optical transmitter embedded within a first reconfigurable optical add-drop multiplexer circuit pack of a first optical node to a wavelength within a band of wavelengths;
generating a test signal over the wavelength;
forwarding the wavelength to an optical path;
receiving the wavelength from the optical path at a second reconfigurable optical add-drop multiplexer circuit pack of a second optical node; and
recording a performance of the test signal at the second reconfigurable optical add-drop multiplexer circuit pack using an optical receiver embedded within the second reconfigurable optical add-drop multiplexer circuit pack.

13. The method of claim 12, further comprising:
counting occurrences of each optical span within identified optical paths between network nodes to create a second total for each optical span; and
dividing the total for each optical span by the second total for each optical span to create a third total for each optical span,
wherein comparing optical spans comprises comparing the third total for each optical span.

14. The method of claim 12, further comprising:
counting occurrences of each optical span within identified optical paths between network nodes to create a second total for each optical span; and
dividing the second total for each optical span by the total for each optical span to create a third total for each optical span,
wherein comparing optical spans comprises comparing the third total for each optical span.

15. The method of claim 12, further comprising:
counting occurrences of each optical span within identified optical paths between network nodes to create a second total for each optical span; and
subtracting the total for each optical span from the second total for each optical span to create a third total for each optical span,
wherein comparing optical spans comprises comparing the third total for each optical span.

16. The method of claim 12, further comprising:
counting occurrences of each optical span within identified optical paths between network nodes to create a second total for each optical span;
subtracting the total for each optical span from the second total for each optical span to create a third total for each optical span; and
dividing the third total for each optical span by the second total for each optical span to create a fourth total for each optical span,
wherein comparing optical spans comprises comparing the fourth total for each optical span.

17. The method of claim 12, further comprising:
counting occurrences of each optical span within identified optical paths between network nodes to create a second total for each optical span;
subtracting the total for each optical span from the second total for each optical span to create a third total for each optical span; and
dividing the second total for each optical span by the third total for each optical span to create a fourth total for each optical span,
wherein comparing optical spans comprises comparing the fourth total for each optical span.

* * * * *